US012738425B2

(12) United States Patent
Okawauchi et al.

(10) Patent No.: US 12,738,425 B2
(45) Date of Patent: Sep. 15, 2026

(54) LAMINATE CAPACITOR AND SEMICONDUCTOR DEVICE

(71) Applicant: ROHM CO., LTD., Kyoto (JP)

(72) Inventors: Yuta Okawauchi, Kyoto (JP); Yasuo Kanetake, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 565 days.

(21) Appl. No.: 18/253,163

(22) PCT Filed: Nov. 15, 2021

(86) PCT No.: PCT/JP2021/041844
§ 371 (c)(1),
(2) Date: May 16, 2023

(87) PCT Pub. No.: WO2022/124011
PCT Pub. Date: Jun. 16, 2022

(65) Prior Publication Data

US 2024/0006123 A1 Jan. 4, 2024

(30) Foreign Application Priority Data

Dec. 7, 2020 (JP) ................................ 2020-202663

(51) Int. Cl.
*H01G 4/30* (2006.01)
*H01G 4/005* (2006.01)
(Continued)

(52) U.S. Cl.
CPC ............... *H01G 4/30* (2013.01); *H01G 4/005* (2013.01); *H01G 4/08* (2013.01); *H01G 4/232* (2013.01); *H02M 7/48* (2013.01)

(58) Field of Classification Search
CPC ............ H01G 4/30; H01G 4/08; H01G 4/005; H01G 4/232; H01G 4/008; H02M 7/48
(Continued)

(56) References Cited

U.S. PATENT DOCUMENTS 6,147,587 A * 11/2000 Hadano .................... H01C 7/10 338/21
7,135,955 B2 * 11/2006 Feichtinger ............ H01C 7/041 257/703

(Continued)

FOREIGN PATENT DOCUMENTS

EP 3 683 813 A1 7/2020
JP 08-097078 4/1996

(Continued)

OTHER PUBLICATIONS

Office Action received in the corresponding German Patent application, Dec. 22, 2023, and machine translation (15 pages).

(Continued)

*Primary Examiner* — Arun Ramaswamy
(74) *Attorney, Agent, or Firm* — HSML P.C.

(57) ABSTRACT

A multilayer capacitor includes a stacked body, a first external electrode, and a second external electrode. The stacked body includes a plurality of laminate sections and a plurality of insulating layers arranged alternately in z direction. Each laminate section includes a first conductor, a second conductor, a third conductor, and a dielectric member. The first conductor connects to the first external electrode, and the second conductor connects to the second external electrode. The third conductor includes a first part and a second part. The dielectric member has a first surface and a second surface spaced apart from each other in the z direction. The first surface is in contact with at least the first conductor, and the second surface is in contact with at least the first part. The laminate sections include two adjacent laminate sections in the z direction, and the first surfaces or the second surfaces of these two laminate sections face each other in the z direction.

18 Claims, 32 Drawing Sheets

(51) Int. Cl.
*H01G 4/08* (2006.01)
*H01G 4/232* (2006.01)
*H02M 7/48* (2007.01)

(58) Field of Classification Search
USPC ............. 361/301.4, 303, 321.1, 306.3, 321.3
See application file for complete search history.

(56) References Cited

U.S. PATENT DOCUMENTS

| | | | | |
|---|---|---|---|---|
| 8,730,645 | B2 * | 5/2014 | Feichtinger .............. | H01G 4/30<br>361/301.4 |
| 10,937,575 | B2 * | 3/2021 | Kirk ......................... | H01C 1/14 |
| 2015/0179339 | A1 | 6/2015 | Seo et al. | |
| 2019/0180943 | A1 * | 6/2019 | Togawa ............... | H10N 30/871 |

FOREIGN PATENT DOCUMENTS

| | | |
|---|---|---|
| JP | 2018-56221 A | 4/2018 |
| JP | 2019-106407 | 6/2019 |

OTHER PUBLICATIONS

Office Action issued in corresponding Japanese Patent application, Sep. 24, 2025, and machine translation (10 pages).
International Search Report issued in International Application No. PCT/JP2021/041844, Jan. 25, 2022, 2 pages.
Office Action issued in corresponding Japanese Patent application No. 2022-568133, Jan. 20, 2026, and machine translation (12 pages).
Office Action issued in corresponding Japanese patent application No. 2022-568133, Jun. 30, 2026, 6 pages with English translation.

* cited by examiner

LAMINATE CAPACITOR AND SEMICONDUCTOR DEVICE

TECHNICAL FIELD

The present disclosure relates to a laminate or multilayer capacitor, and also to a semiconductor device equipped with a multilayer capacitor.

BACKGROUND ART

Conventionally, power conversion devices (e.g. inverters) are incorporated in, for example, vehicles and industrial machinery. In the electronic circuits of such power conversion devices, capacitors are used, for example, for smoothing voltage. Patent Document 1 discloses a conventional multilayer capacitor. The multilayer capacitor disclosed in Document 1 has a plurality of first internal electrodes, a plurality of second internal electrodes, a plurality of dielectric films, a plurality of insulating materials and a pair of external electrodes. Each first internal electrode is connected to one of the pair of external electrodes and each second internal electrode is connected to the other of the pair of external electrodes. The plurality of first internal electrodes and the plurality of second internal electrodes have opposite polarity to each other when the multilayer capacitor is energized. In this multilayer capacitor, an insulating film, a first internal electrode, a dielectric film and a second internal electrode are stacked in this order to form one laminate, and a plurality of such laminates are stacked to form the capacitor. In each laminate, the insulating film is sandwiched between the first and second internal electrodes to insulate these two electrodes from each other.

PRIOR ART DOCUMENT

Patent Document

Patent document 1: JP-A-H08-97078

SUMMARY OF THE INVENTION

Problem to be Solved by the Invention

In the multilayer capacitor described in Patent Document 1, when a potential difference is generated between the first and second inner electrodes, a voltage is applied not only to the dielectric films but also to the insulating films. The dielectric strength of this multilayer capacitor is therefore limited to the dielectric strength of the dielectric films or the dielectric strength of the insulation films, depending on whichever is lower.

In view of the above circumstances, it is one objective of the present disclosure to provide a multilayer capacitor capable of suppressing a decrease in dielectric strength. Another objective of the present disclosure is to provide a semiconductor device equipped with such a multilayer capacitor.

Means to Solve the Problem

According to a first aspect of the present disclosure, there is provided a multilayer capacitor comprising: a stacked body including a first side surface and a second side surface that are spaced apart from each other in a first direction; a first external electrode including a first side surface covering portion covering the first side surface; and a second external electrode including a second side surface covering portion covering the second side surface. The stacked body includes a plurality of laminate sections and a plurality of insulating layers that are arranged alternately in a second direction perpendicular to the first direction. Each of the laminate sections includes a first conductor, a second conductor, a third conductor, and a dielectric member. In each laminate section, the first conductor is connected to the first side surface covering portion and spaced apart from the second external electrode, the second conductor is connected to the second side surface covering portion and spaced apart from the first external electrode, and the third conductor includes a first part and a second part each of which is spaced apart from the first conductor and the second conductor and also spaced apart from the first external electrode and the second external electrode. The first part and the first conductor sandwich the dielectric member in the second direction. The second part and the second conductor sandwich the dielectric member in the second direction. The dielectric member has a first surface and a second surface spaced apart from each other in the second direction. At least the first conductor is in contact with the first surface, and at least the first part is in contact with the second surface. Each of the insulating layers has a lower dielectric withstanding voltage than the dielectric member of each laminate section. The plurality of laminate sections includes two laminate sections adjacent in the second direction, and the first surfaces or the second surfaces of the respective two laminate sections are arranged to face each other in the second direction.

According to a second aspect of the present disclosure, there is provided a semiconductor device comprising: a multilayer capacitor of the first aspect; a first switching element having a first element obverse surface and a first element reverse surface that are spaced apart from each other in the second direction; a second switching element having a second element obverse surface and a second element reverse surface that are spaced apart from each other in the second direction; and a first conductive member and a second conductive member that are spaced apart from each other. The first switching element and the second switching element are connected in series and form a bridge. The first external electrode and the second external electrode are electrically connected to a first end and a second end of the bridge, respectively. The multilayer capacitor and the first switching element are mounted on the first conductive member, while the second switching element is mounted on the second conductive member.

Advantages of the Invention

With the above arrangements, it is possible to provide a multilayer capacitor capable of suppressing a decrease in dielectric strength.

BRIEF DESCRIPTION OF DRAWINGS

FIG. 33 is a cross-sectional view along the XXXIII-XXXIII line of FIG. 27.

FIG. 36 is a cross-sectional view showing a semiconductor device according to another variation of the present disclosure.

MODE FOR CARRYING OUT THE INVENTION

Figure 1:
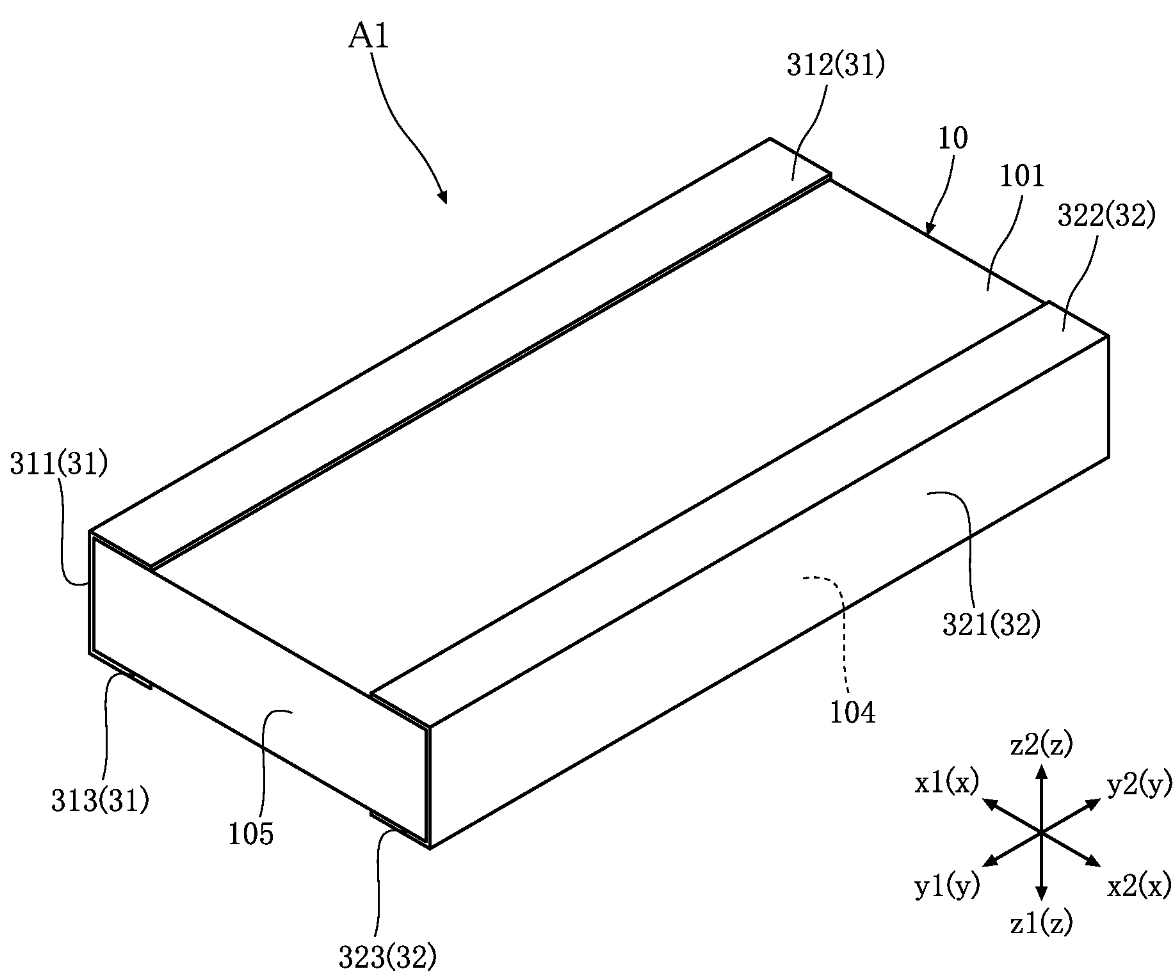
FIG. 1 is a perspective view of a multilayer capacitor according to a first embodiment.

Preferred embodiments of the present disclosure are described below with reference to the drawings. In the following description, identical or similar components will be indicated by the same reference signs and redundant descriptions will be omitted.

FIGS. 1 to 12 show a multilayer capacitor A1 according to a first embodiment. The multilayer capacitor A1 has a stacked body 10 and a pair of external electrodes 31, 32. The stacked body 10 includes a plurality of laminate sections 20 and a plurality of insulating layers 29 stacked alternately with each other. Each laminate section 20 includes a first conductor 21, a second conductor 22, a third conductor 23, a dielectric material or layer 24 and an insulator 25.

Figure 2:
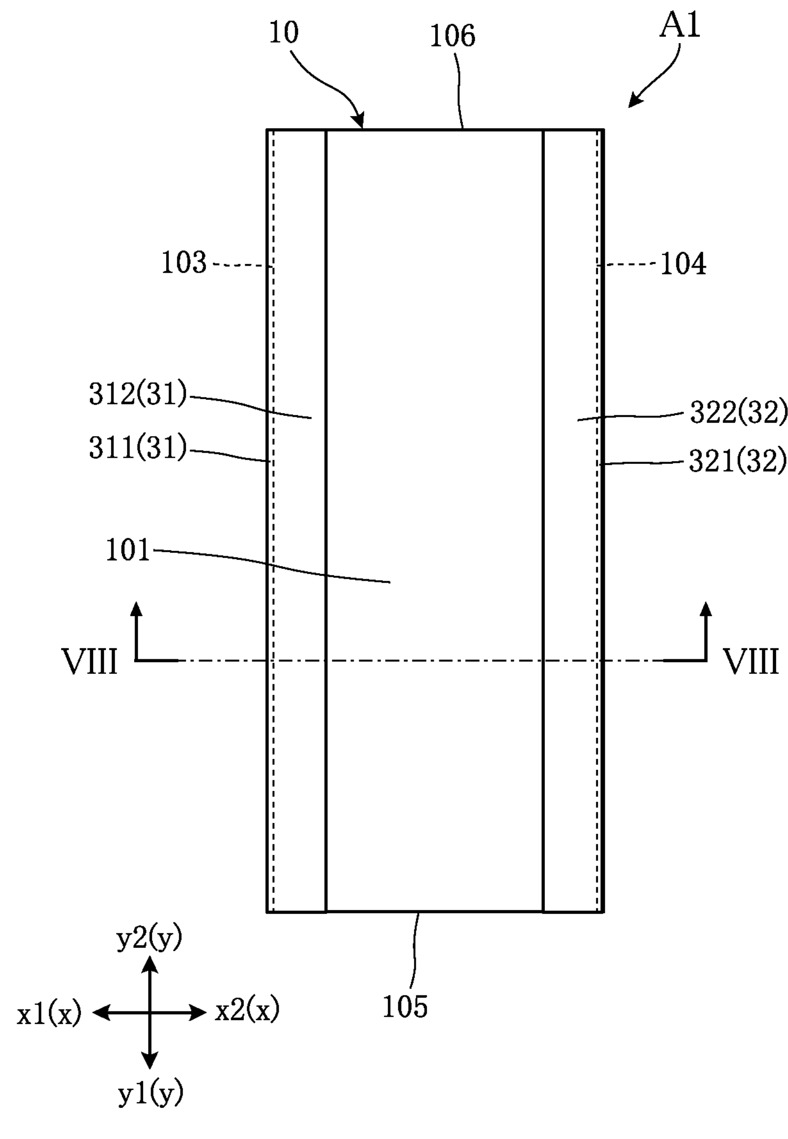
FIG. 2 is a plan view showing the multilayer capacitor according to the first embodiment.
Figure 3:
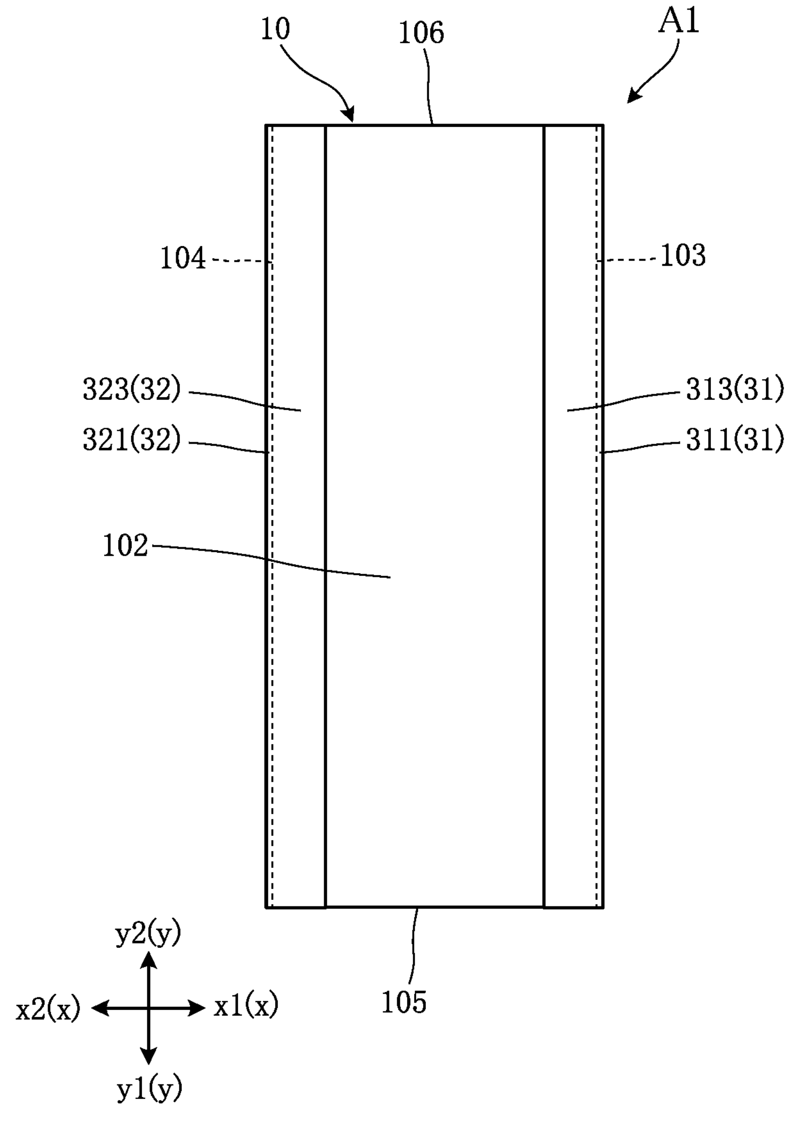
FIG. 3 shows a bottom view of the multilayer capacitor according to the first embodiment.
Figure 4:
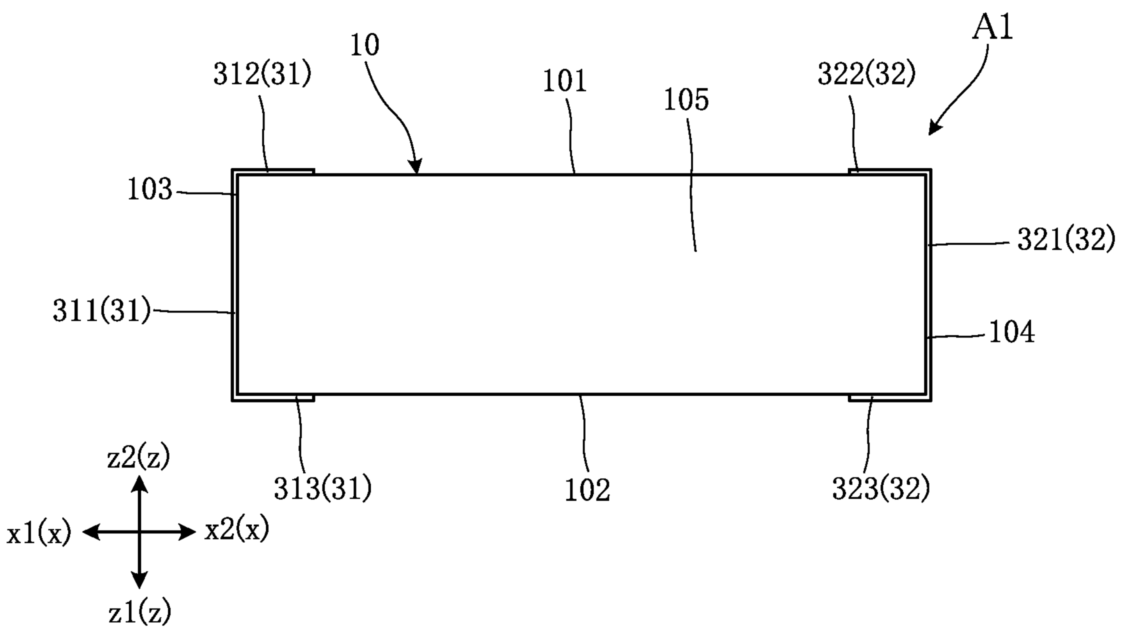
FIG. 4 is a front view showing the multilayer capacitor according to the first embodiment.
Figure 5:
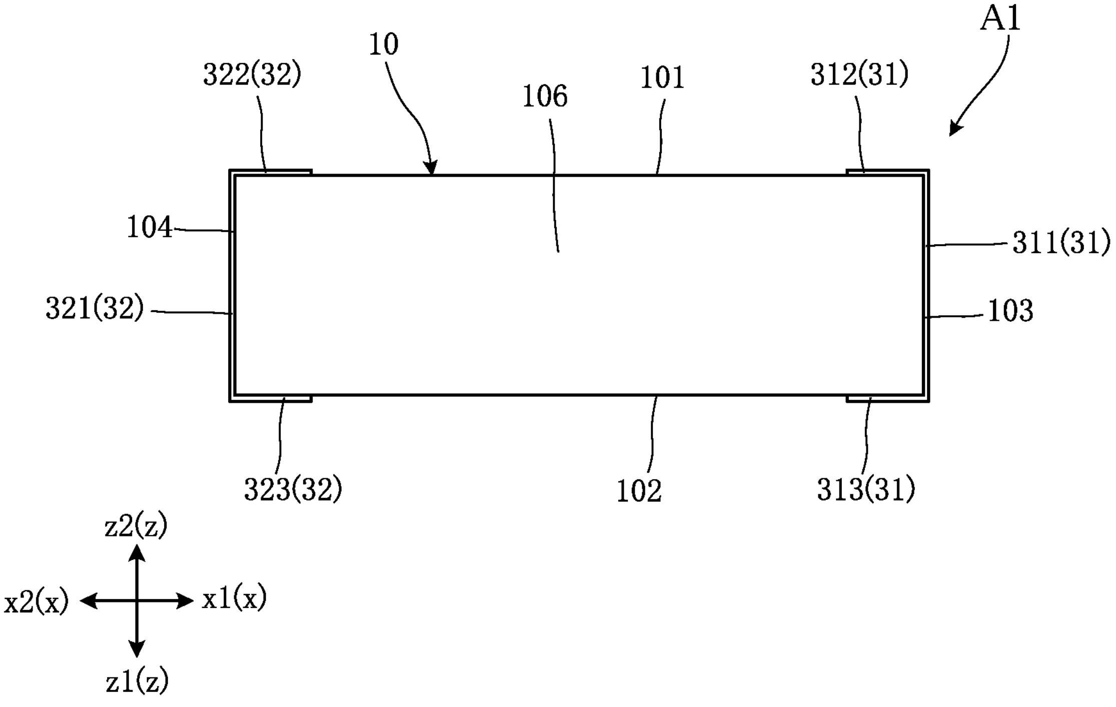
FIG. 5 shows a rear view of the multilayer capacitor according to the first embodiment.
Figure 6:
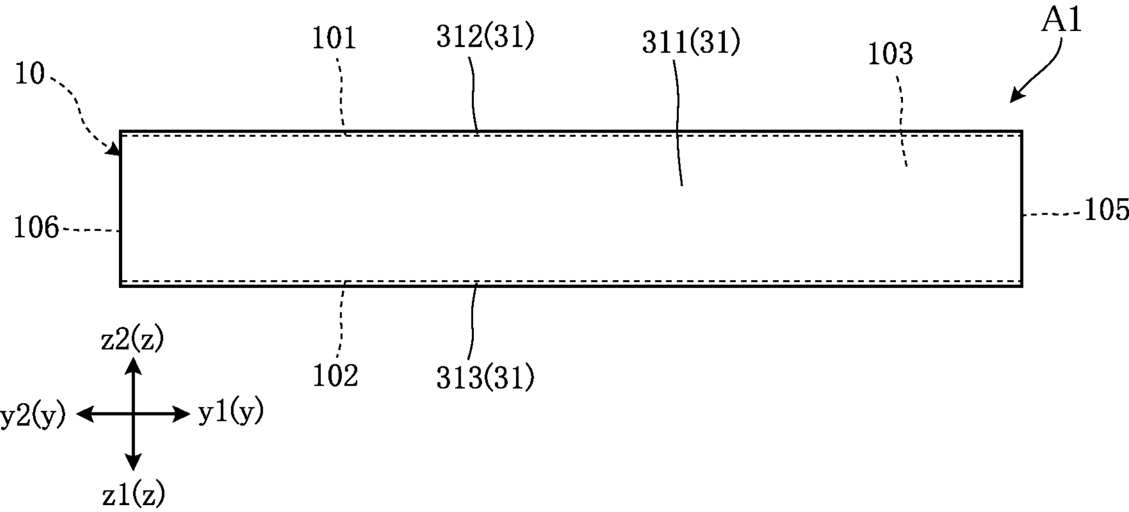
FIG. 6 is a left side view showing the multilayer capacitor according to the first embodiment.
Figure 7:
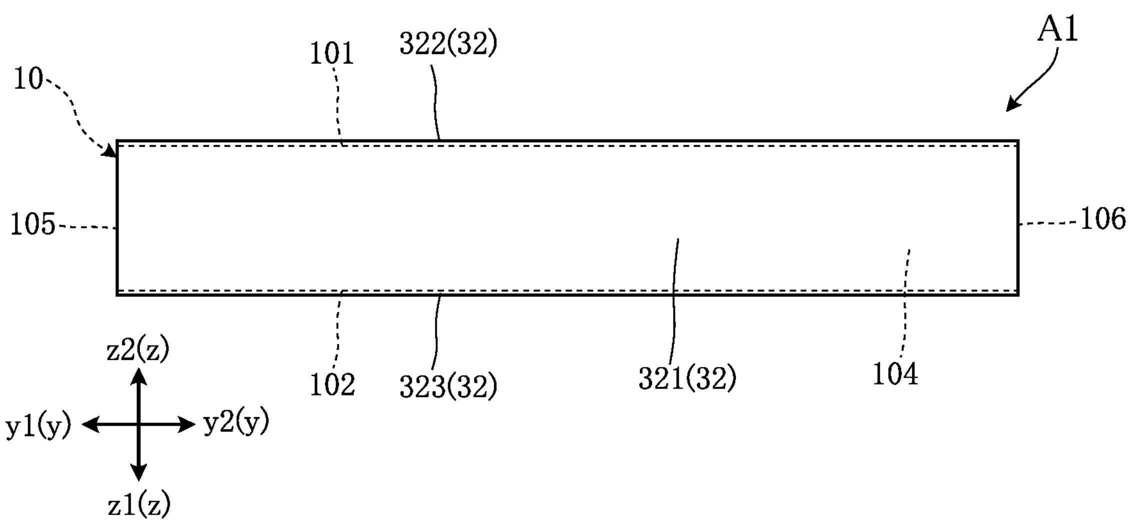
FIG. 7 is a right side view showing the multilayer capacitor according to the first embodiment.
Figure 8:
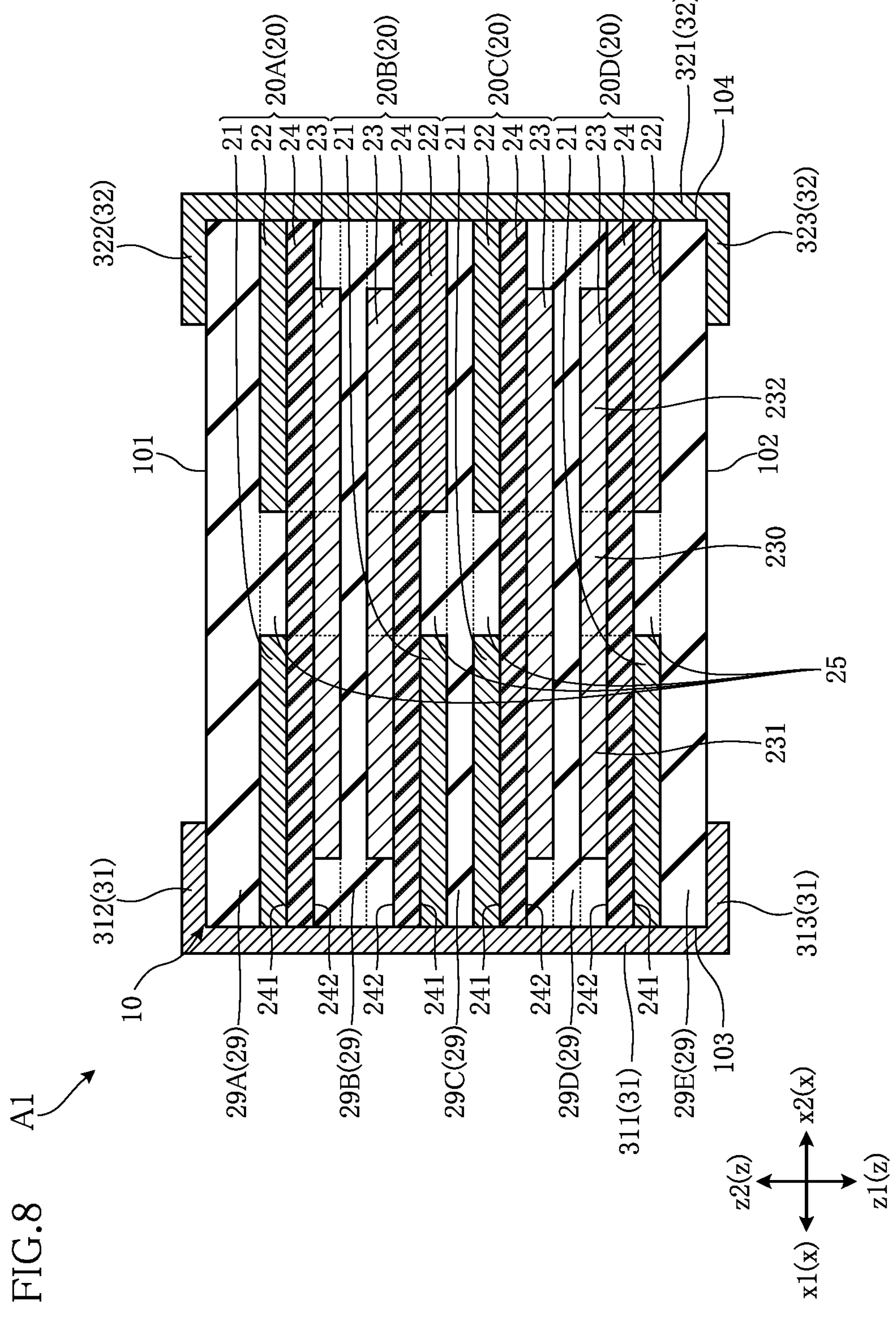
FIG. 8 is a cross-sectional view along the VIII-VIII line of FIG. 2.
Figure 9:
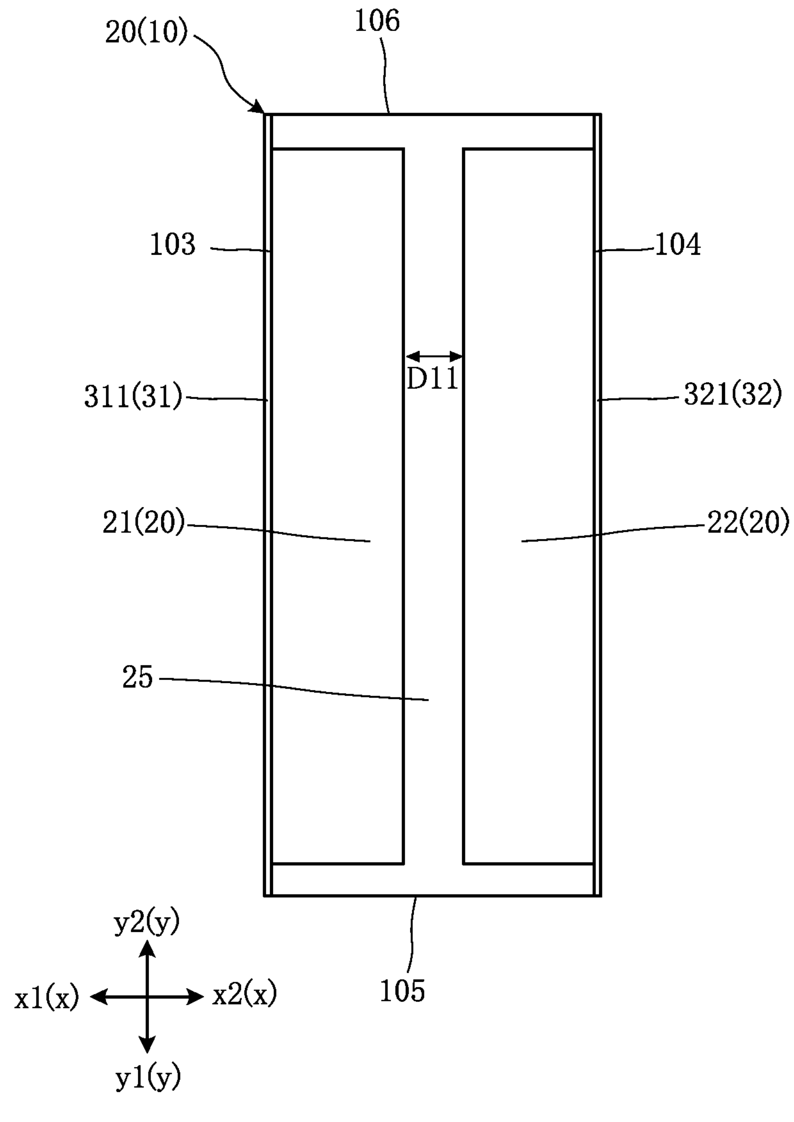
FIG. 9 is a plan view of a layer including a first conductor and a second conductor of a stacked section according to the first embodiment.
Figure 10:
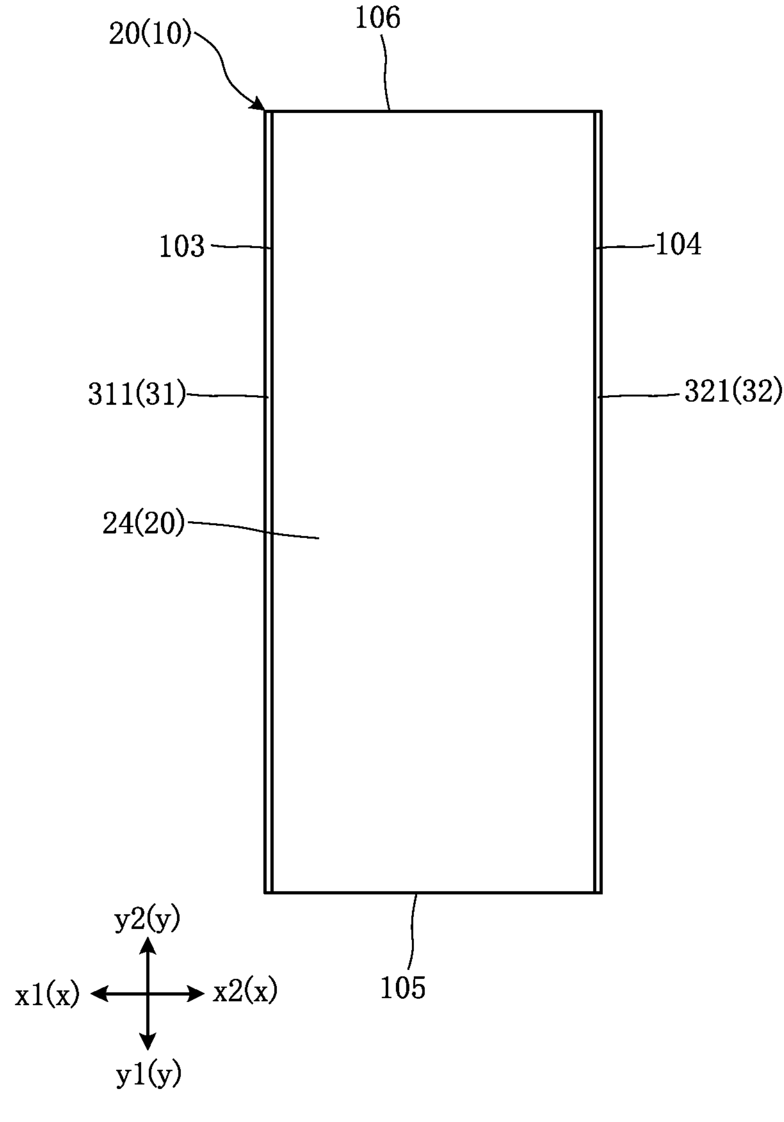
FIG. 10 is a plan view showing a layer including a dielectric layer of the stacked section according to the first embodiment.
Figure 11:
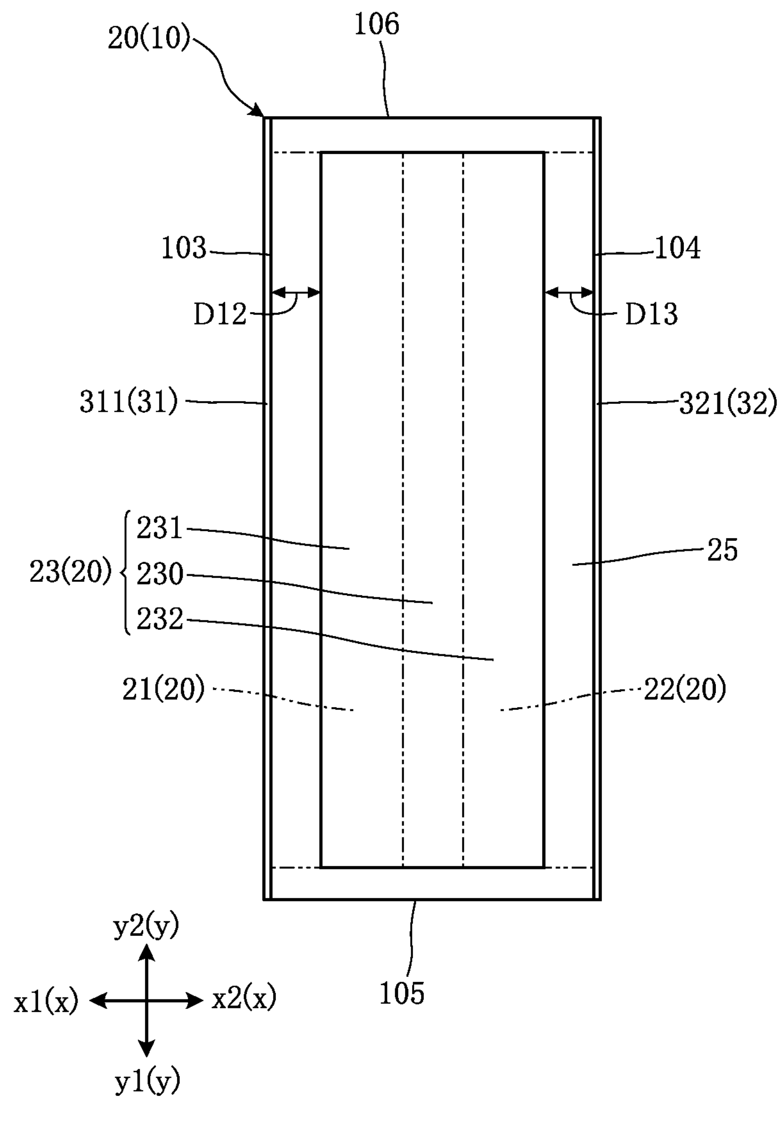
FIG. 11 is a plan view showing a layer including a third conductor of the stacked section according to the first embodiment.
Figure 12:
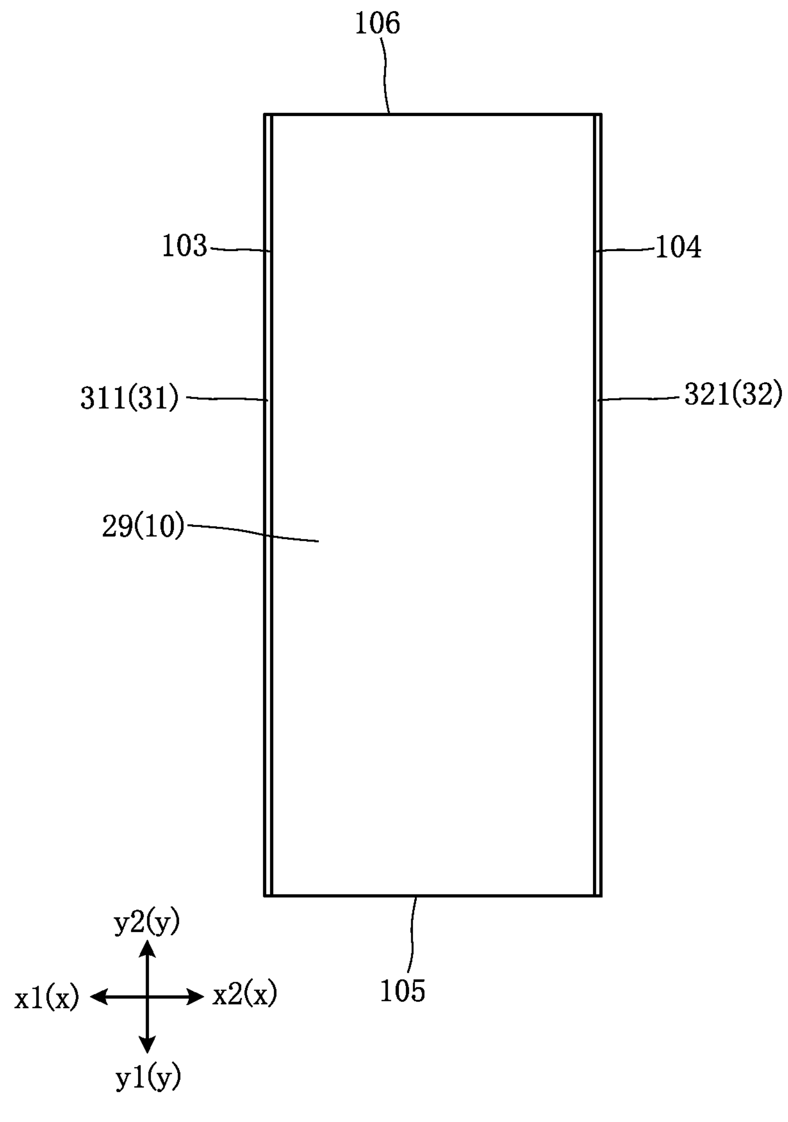
FIG. 12 is a plan view showing an insulating layer according to the first embodiment.

FIG. 1 shows a perspective view of multilayer capacitor A1. FIG. 2 shows a plan view of the multilayer capacitor A1. FIG. 3 shows a bottom view of the multilayer capacitor A1. FIG. 4 shows a front view of the multilayer capacitor A1. FIG. 5 shows a rear view of the multilayer capacitor A1. FIG. 6 shows a left side view of the multilayer capacitor A1. FIG. 7 is a right side view showing multilayer capacitor A1. FIG. 8 is a cross-sectional view along line VIII-VIII of FIG. 2. FIGS. 9 to 11 each show a plan view of a part of the laminate section 20. FIG. 9 is a plan view of a layer including the first conductor 21 and the second conductor 22 of the laminate section 20. FIG. 10 is a plan view showing a layer including dielectric layer 24 of the stacked body 20. FIG. 11 is a plan view showing a layer including the third conductor 23 of the laminate section 20. FIG. 12 is a plan view showing an insulating layer 29.

In the following description, reference is made to three mutually orthogonal directions, i.e. x direction, y direction and z direction. z direction is, for example, the "thickness direction" of the multilayer capacitor A1. "In plan view" is equivalent to as viewed in the z direction.

The stacked body 10 is, for example, rectangular (or substantially rectangular). The stacked body 10 may be cubic instead of rectangular. In the example shown in FIG. 2, the stacked body 10 is rectangular in plan view, relatively short in the x direction and relatively long in the y direction. Alternatively, it may have a rectangular shape, which is relatively long in the x direction and relatively short in the y direction. The stacked body 10 has an obverse surface 101, a reverse surface 102 and a plurality of side surfaces 103-106.

The obverse surface 101 and the reverse surface 102 are spaced apart in the z direction, as shown in FIGS. 4 to 8. The obverse surface 101 faces in the z2 sense and the reverse surface 102 faces in the z1 sense. A plurality of side surfaces 103-106 are disposed between the obverse surface 101 and the reverse surface 102 in the z direction and are connected to the obverse surface 101 and the reverse surface 102. The side surfaces 103 and 104 are spaced apart in the x direction, as shown in FIG. 2. The side surface 103 faces in the x1 sense and the side surface 104 faces in the x2 sense. The side surface 105 and the side surface 106 are spaced apart in the y direction, as shown in FIG. 2. The side surface 105 faces in the y1 sense and the side surface 106 faces in the y2 sense.

The stacked body 10 includes a plurality of laminate sections 20 and a plurality of insulating layers 29, as described above. In this embodiment, as shown in FIG. 8, the stacked body 10 includes four laminate sections 20 and five insulating layers 29. For convenience of understanding, the four laminate sections 20 are distinguished as laminate section 20A, laminate section 20B, laminate section 20C and laminate section 20D. When distinguishing the five insulation layers 29, they shall be referred to as insulation layer 29A, insulation layer 29B, insulation layer 29C, insulation layer 29D and insulation layer 29E. The plurality of laminate sections 20 and the plurality of insulating layers 29 are stacked in the z direction according to the configuration described in detail below.

The plurality of insulation layers 29 each comprise, for example, a prepreg. Each insulation layer 29 insulates two laminate sections 20 held in contact with the two respective surfaces of the layer 29 in the z direction. Each insulation layer 29 also serves as an adhesive layer for adjacent two laminate sections 20 each contacting one of the two surfaces of the layer 29 in the z direction. Each insulation layer 29 has a lower dielectric withstanding voltage (dielectric strength) than each dielectric layer 24. The thickness of each insulation layer 29 is, for example, equal to or greater than 40 μm and equal to or smaller than 100 μm.

In the example shown in FIG. 8, the insulating layer 29A is a surface layer on the z2 direction side of the stacked body 10 and is sandwiched between an obverse surface covering members 312, 322 and the laminate section 20A, described below. The insulating layer 29B is sandwiched between the laminate section 20A and the laminate section 20B. The insulating layer 29C is sandwiched between the laminate section 20B and the laminate section 20C. The insulating layer 29D is sandwiched between the laminate section 20C and the laminate section 20D. The insulating layer 29E is a surface layer on the z1 direction side of the stacked body 10 and is sandwiched between reverse surface covering members 313, 323 and the laminate section 20D, described below.

The plurality of laminate sections 20 each include a first conductor 21, a second conductor 22, a third conductor 23, a dielectric layer 24 and an insulator 25, as described above.

In each laminate section 20, the first conductor 21 comprises, for example, Cu or a Cu alloy. The first conductor 21 is formed into the shape of a layer. The thickness of each first conductor 21 is, for example, equal to or greater than 30 μm and equal to or smaller than 70 μm. Each first conductor 21 is held in contact with and electrically connected to the external electrode 31. Each first conductor 21 is spaced apart from the external electrode 32 and insulated from the external electrode 32. Each first conductor 21 is in contact with the dielectric layer 24 (first surface 241 described below), as shown in FIG. 8. The first conductors 21 overlap with each other in plan view, as shown in FIG. 8. Each first conductor 21 extends from an end of the laminate section 20 in the x1 direction to the x2 direction in plan view, as shown in FIGS. 8 and 9. Each first conductor 21 has the end on the x1 direction side exposed at the side surface 103, as shown in FIGS. 8 and 9. Each first conductor 21 is not exposed in plan view at either the side surface 105 or the side surface 106, as shown in FIG. 9. Each first conductor 21 has an end on the y1-direction side more inwardly of the stacked body 10 with respect to the side surface 105 and another end on the y2-direction side more inwardly of the stacked body 10 with respect to the side surface 106, in plan view.

In each laminate section 20, the second conductor 22 comprises, for example, Cu or a Cu alloy. The second conductor 22 is formed into the shape of a layer. The thickness of each second conductor 22 is, for example, equal to or greater than 30 μm and equal to or smaller than 70 μm. Each second conductor 22 is held in contact with and electrically connected to the external electrode 32. Each second conductor 22 is spaced apart from the external electrode 31 and insulated from the external electrode 31. Each second conductor 22 is in contact with the dielectric layer 24 (first surface 241 described below), as shown in FIG. 8. The second conductor 22 is spaced apart from the first conductor 21. As shown in FIGS. 8 and 9, each second conductor 22 is located away from each first conductor 21 in the x2 direction. The second conductors 22 overlap with each other in plan view, as shown in FIG. 8. Each second conductor 22 extends from an end of the laminate section 20 in the x2 direction to the x1 direction in plan view, as shown in FIGS. 8 and 9. Each second conductor 22 has the end on the x2 direction side exposed at the side surface 104, as shown in FIGS. 8 and 9. Each second conductor 22 is not exposed in plan view at either the side surface 105 or the side surface 106, as shown in FIG. 9. Each second conductor 22 has an end on the y1-direction side more inwardly of the laminate section 20 (stacked body 10) with respect to the side surface 105 and another end on the y2-direction side more inwardly of the laminate section 20 (stacked body 10) with respect to the side surface 106, in plan view.

In each laminate section 20, the third conductor 23 comprises, for example, Cu or a Cu alloy. In the illustrated example, the third conductor 23 is formed into the shape of a layer. The thickness of each third conductor 23 is, for example, equal to or greater than 30 μm and equal to or smaller than 70 μm. Each third conductor 23 is spaced apart from the two external electrodes 31, 32 and isolated from the respective external electrodes 31, 32. As shown in FIG. 8, each third conductor 23 is in contact with the dielectric layer 24 (second surface 242 described below). As shown in FIG. 8, the third conductors 23 overlap with each other in plan view. Each third conductor 23 is not exposed at any one of the side surfaces 103 to 106. As shown in FIG. 11, in plan view, each third conductor 23 has an end on the x1 direction side more inwardly of the laminate section 20 (stacked body 10) with respect to the side surface 103, and has an end on the x2 direction side more inwardly of the laminate section 20 (stacked body 10) with respect to the side surface 104, and has an end on the y1 direction side more inwardly of the laminate section 20 (stacked body 10) with respect to the side surface 105, and has an end on the y2 direction side more inwardly of the laminate section 20 (stacked body 10) with respect to the side surface 106.

The third conductor 23 includes a first part 231, a second part 232 and a connecting part 230, as shown in FIGS. 8 and 11. The connecting part 230 connects the first part 231 and the second part 232 to each other. The connecting part 230 does not overlap with the respective first conductors 21 or the respective second conductors 22 in plan view. The first part 231 is a section of each third conductor 23 that, in plan view, overlaps with the first conductors 21. The first part 231 and the first conductor 21 sandwich the dielectric layer 24 in the z direction. The second part 232 is a section of each third conductor 23 that overlaps with the second conductors 22 in plan view. The second part 232 and the second conductor 22 sandwich the dielectric layer 24 in the z direction.

In the illustrate embodiment, as understood from FIGS. 8 and 11, the area of the region where each first conductor 21 and each third conductor 23 overlap (the area of each first part 231) in plan view and the area of the region where each second conductor 22 and each third conductor 23 overlap (the area of each second part 232) in plan view are substantially the same. Unlike this example, the area where each first conductor 21 and each third conductor 23 overlap (the area of each first part 231) may be larger or smaller than the area where each second conductor 22 and each third conductor 23 overlap (the area of each second part 232).

In each laminate section 20, the dielectric layer 24 is sandwiched in the z direction between the first conductor 21 and a part of the third conductor 23 (first part 231) and also between the second conductor 22 and a part of the third conductor 23 (second part 232). Each dielectric layer 24 comprises a film-like resin material, for example a polymer film. The material of each dielectric layer 24 is not limited to a film-like resin material, but may be, for example, a material with a relative permittivity greater than 1. Such materials include, for example, ceramics based on metal oxide perovskite compounds. The thickness of the dielectric layer 24 is, for example, equal to or greater than 2 μm and equal to or smaller than 25 μm.

Each dielectric layer 24 has a first surface 241 and a second surface 242, as shown in FIG. 8. The first surface 241 and the second surface 242 are spaced apart in the z direction and face away from each other. At least the first conductor 21 is formed on the first surface 241, and in the multilayer capacitor A1, the second conductor 22 is also formed on the same surface. On the second surface 242, at least the first part 231 is formed, and in the multilayer capacitor A1 the rest of the third conductor 23 (the second part 232 and the connecting part 230) is also formed.

As shown in FIG. 10, in plan view, each dielectric layer 24 extends from the end of the laminate section 20 in the x1 direction to the other end in the x2 direction, while also extending from the end of the laminate section 20 in the y1 direction to the other end in the y2 direction. Each dielectric layer 24 extends, in plan view, in the x direction from the side surface 103 to the other side surface 104 of the stacked body 10, while also extending in the y direction from the side surface 105 to the other side surface 106 of the stacked body 10. Thus, in each laminate section 20, the dielectric layer 24 is exposed on any of the side surfaces 103 to 106.

The plurality of insulators 25 comprise the same material as the insulating layers 29, for example. Each insulator 25 is in contact with one of the plurality of insulating layers 29 and is integrally formed with this insulating layer 29. In plan view, the plurality of insulators 25 are disposed around the first conductors 21 (excluding their ends in the x1 direction), around the second conductors 22 (excluding their ends in the x2 direction) and around the third conductors 23. The plurality of insulators 25 are, as understood from FIGS. 8 and 9, arranged between the first conductors 21 and the second conductors 22, between the first conductors 21 and the side surface 105, between the first conductors 21 and the side surface 106, between the second conductors 22 and the side surface 105, and between the second conductors 22 and the side surface 106. Further, the plurality of insulators 25, as understood from FIGS. 8 and 11, include those arranged between the third conductors 23 and the side surface 103, between the third conductors 23 and the side surface 104, between the third conductors 23 and the side surface 105, and between the third conductors 23 and the side surface 106. The separation distance D11 (see FIG. 9) in the x direction between the first conductor 21 and the second conductor 22 is provided such that no insulation breakdown occurs in the insulator 25 disposed between the first conductor 21 and the second conductor 22.

In each laminate section 20, when a potential difference is created between the first conductor 21 and the second conductor 22, a capacitor (referred to as "first capacitor" below) is formed with the first conductor 21 as one electrode plate and the first part 231 as the other electrode plate. Likewise, a capacitor ("second capacitor") is formed with the second conductor 22 as one electrode plate and the second part 232 as the other electrode plate. In each laminate section 20, the first capacitor and the second capacitor are connected in series between the first conductor 21 and the second conductor 22. The capacitance of each laminate section 20 is the combined capacitance of the first and second capacitors. In this configuration, the potential of the third conductor 23 is between the potential of the first conductor 21 and the potential of the second conductor 22. In the multilayer capacitor A1, as described above, in plan view, the area in which each first conductor 21 and each third conductor 23 overlap (the area of each first part 231) and the area in which each second conductor 22 and each third conductor 23 overlap (the area of each second part 232) are the same (or substantially the same). Therefore, the respective capacitances of the first and second capacitors are the same (or substantially the same).

In two adjacent laminate sections 20 of the plurality of laminate sections 20, the first surfaces 241 of the respective dielectric layers 24, or the second surfaces 242 of the respective dielectric layers 24, are arranged face each other with the insulating layer 29 intervening in the z direction. For example, as shown in FIG. 8, the second surface 242 of the dielectric layer 24 in the laminate section 20A and the second surface 242 of the dielectric layer 24 in the laminate section 20B face each other across the insulating layer 29B. As a result, the insulating layer 29B is sandwiched between the third conductor 23 of the laminate section 20A and the third conductor 23 of the laminate section 20B, between the dielectric layer 24 of the laminate section 20A and the dielectric layer 24 of the laminate section 20B. As shown in FIG. 8, the first surface 241 of the dielectric 24 in the laminate section 20B and the first surface 241 of the dielectric layer 24 in the laminate section 20C face each other across the insulating layer 29C. As a result, the insulating layer 29C is sandwiched between the dielectric layer 24 in the laminate section 20B and the dielectric layer 24 in the laminate section 20C, while being sandwiched between the first conductor 21 in the laminate section 20B and the first conductor 21 in the laminate section 20C. Furthermore, as shown in FIG. 8, the second surface 242 of the dielectric layer 24 in the laminate section 20C and the second surface 242 of the dielectric layer 24 in the laminate section 20D face each other across the insulating layer 29D. As a result, the insulating layer 29D is sandwiched between the third conductor 23 in the laminate section 20C and the third conductor 23 in the laminate section 20D, between the dielectric layer 24 in the laminate section 20C and the dielectric layer 24 in the laminate section 20D.

The capacitance C [F] of the multilayer capacitor A1 is calculated by formula (1) below. In formula (1), N is the number of laminate sections 20 (number of layers). $C_{20}$ is the capacitance of the laminate section 20, which is the combined capacitance of the capacitance $C_1$ of the first capacitor and the capacitance $C_2$ of the second capacitor. In this system, the first and second capacitors are connected in series, so the capacitance $C_{20}$ is calculated using formula (2) below. The capacitance $C_1$ [F] of the first capacitor is calculated by formula (3) below, and the capacitance $C_2$ [F] of the second capacitor is calculated by formula (4) below. In formulae (3) and (4), co is the dielectric constant of the vacuum, Cr is the relative dielectric constant of the dielectric (each dielectric layer 24), $S_1$ is the area of the overlap between the first conductors 21 and the first parts 231 in plan view (overlap area), $S_2$ is the area of the overlap between the second conductors 22 and the second parts 232 in plan view (overlap area), $D_1$ is the separation distance in the z direction between the first conductor 21 and the first part 231, D2 is the separation distance in the z direction between the second conductor 22 and the second part 232.

$$C = N \cdot C_{20} \tag{1}$$

$$1/C_{20} = 1/C_1 + 1/C_2 \tag{2}$$

$$C_1 = \varepsilon_0 \cdot \varepsilon_r \cdot (S_1/D_1) \tag{3}$$

$$C_2 = \varepsilon_0 \cdot \varepsilon_r \cdot (S_2/D_2) \tag{4}$$

In the stacked body 10, the x directional dimension, y directional dimension and z directional dimension (thickness) of each first conductor 21, each second conductor 22, each third conductor 23 and each dielectric layer 24, the constituent material of each layer and the number of layers in the stacked section 20 can be changed according to required specifications (e.g. capacitance, size, dielectric withstanding voltage) of the multilayer capacitor A1. For instance, based on formula (1) above, if the number N of layers of laminate section 20 is increased, the capacitance C of the multilayer capacitor A1 can be increased (however, the dimension in the z direction will increase). Also, based on formulae (3) and (4) above, if the thickness of the dielectric layer 24 (the separation distance $D_1$ in the z direction between each first conductor 21 and each first part 231, and the separation distance $D_2$ in the z direction between each second conductor 22 and each second part 232) is reduced, the capacitance $C_1$ of the first capacitor and the capacitance $C_2$ of the second capacitor can be increased, so that the capacitance $C_{20}$ of each laminate section 20 can be increased (however, the insulating voltage of each dielectric layer 24 becomes smaller). Also, based on formula (3) above, if the overlapping area $S_1$ above is increased, the capacitance $C_1$ of the first capacitor can be increased, so the capacitance $C_{20}$ of each laminate section 20 can be increased (but the plan view size becomes larger). Similarly, if the above overlapping area $S_2$ is increased based on formula (4) above, the capacitance $C_2$ of the second capacitor can be increased, so the capacitance $C_{20}$ of each laminate section 20 can be increased (but the plan view size becomes larger).

The external electrodes 31, 32 are formed on the stacked body 10 so as to cover part of the obverse surface 101, part of the reverse surface 102 and the side surfaces 103, 104. The external electrodes 31, 32 are terminals of the multilayer capacitor A1. The external electrodes 31, 32 are spaced apart and insulated from each other. Each external electrode 31, 32 comprises, for example, Cu or a Cu alloy. The material of each external electrode 31, 32 is not limited to Cu or Cu alloy, but may be any suitable conductive material. Each outer electrode 31, 32 is formed, for example, by a plating process, though the method of forming the outer electrode 31, 32 is not limited to a plating process.

The external electrode 31 is one of the two terminals of the multilayer capacitor A1. The external electrode 31 is electrically connected to the respective first conductors 21. The external electrode 31 includes a side surface covering portion 311, an obverse surface covering portion 312 and a reverse surface covering portion 313.

The side surface covering portion 311 covers the side surface 103, as shown in FIGS. 4, 5, 6 and 8. As the first conductors 21 of the laminate sections 20 are exposed from the side surface 103, the first conductors 21 of the laminate sections 20 are connected to the side surface covering portion 311. The side surface covering portion 311 electrically connects the plurality of first conductors 21 spaced apart in the z direction. Therefore, through the side surface covering portion 311, the plurality of first conductors 21 are at the same potential as each other. The side surface covering portion 311 is spaced apart from the first part 231 of each third conductor 23 in the x direction. The separation distance D12 (see FIG. 11) in the x direction between the side surface covering portion 311 and the first part 231 of each third conductor 23 is provided such that no insulating breakdown occurs in the insulators 25 arranged between the third conductors 23 and the side surface covering portion 311.

The obverse surface covering portion 312 covers part of the obverse surface 101, as shown in FIGS. 2, 4, 5 and 8. The obverse surface covering portion 312 connects to the side surface covering portion 311. The obverse surface covering portion 312 covers the end edge of the obverse surface 101 in the x1 direction and extends from this end edge in the x2 direction, as shown in FIG. 2. The obverse surface covering portion 312 is rectangular, for example, in plan view. The obverse surface covering portion 312 overlaps with the first conductor 21 of the laminate section 20A in plan view.

The reverse surface covering portion 313 covers part of the reverse surface 102, as shown in FIGS. 3, 4, 5 and 8. The reverse surface covering portion 313 connects to the side surface covering portion 311. The reverse surface covering portion 313 covers an end edge of the reverse surface 102 in the x1 direction and extends from this end edge in the x2 direction, as shown in FIG. 3. The reverse surface covering portion 313 is rectangular, for example, in plan view. The reverse surface covering portion 313 overlaps with the first conductor 21 of the laminate section 20D in plan view. The external electrode 31 may further comprise a portion connecting to the side surface covering portion 311, the obverse surface covering portion 312 and the reverse surface covering portion 313 for covering a portion of each of the side surfaces 105, 106. The external electrode 31 may not include the obverse surface covering portion 312 and the reverse surface covering portion 313.

The external electrode 32 is the other terminal of the multilayer capacitor A1. The external electrode 32 is electrically connected to the second conductors 22. The external electrode 32 includes a side surface covering portion 321, an obverse surface covering portion 322 and a reverse surface covering portion 323.

The side surface covering portion 321 covers the side surface 104, as shown in FIGS. 4, 5, 7 and 8. The second conductors 22 of the respective laminate sections 20 are exposed from the side surface 104, so that the second conductor 22 of each laminate section 20 connects to the side surface covering portion 321. The side surface covering portion 321 electrically connects the second conductors 22, spaced apart in the z direction, to each other. Thus, through the side surface covering portion 321, the plurality of second conductors 22 are at the same potential as each other. The side surface covering portion 321 is spaced apart from the second parts 232 of the respective third conductors 23 in the x direction. The separation distance D13 (see FIG. 11) in the x direction between the side surface covering portion 321 and each third conductor 23 (second part 232) is provided such that no insulating breakdown occurs in the insulator 25 disposed between each third conductor 23 and the side surface covering portion 321.

The obverse surface covering portion 322 covers part of the obverse surface 101, as shown in FIGS. 2, 4, 5 and 8. The obverse surface covering portion 322 connects to the side surface covering portion 321. The obverse surface covering portion 322 covers an end edge of the obverse surface 101 in the x2 direction and extends from this end edge in the x1 direction, as shown in FIG. 2. The obverse surface covering portion 322 is rectangular, for example, in plan view. The obverse surface covering portion 322 overlaps with the second conductor 22 of the laminate section 20A in plan view.

The reverse surface covering portion 323 covers part of the reverse surface 102, as shown in FIGS. 3, 4, 5 and 8. The reverse surface covering portion 323 connects to the side surface covering portion 321. The reverse surface covering portion 323 covers an end edge of the reverse surface 102 in the x2 direction and extends from this end edge in the x1 direction, as shown in FIG. 3. The reverse surface covering portion 323 is rectangular, for example, in plan view. The reverse surface covering portion 323 overlaps with the second conductor 22 of the laminate section 20D in plan view. The external electrode 32 may further comprise a portion connecting to the side surface covering portion 321, the obverse surface covering portion 322 and the reverse surface covering portion 323 for covering a portion of each of the side surfaces 105, 106. The external electrode 32 may not include the obverse surface covering portion 322 and the reverse surface covering portion 323.

The advantages of the multilayer capacitor A1 may be as follows.

In multilayer capacitor A1, each dielectric layer 24 has a first surface 241 and a second surface 242 spaced apart from each other in the z direction, with at least a first conductor 21 contacting the first surface 241 and at least a first part 231 (part of the third conductor 23) contacting the second surface 242. The first conductor 21 and the first part 231 sandwich a dielectric layer 24 in the z direction. Two adjacent laminate sections 20 of the plurality of laminate sections 20 in the z direction have respective first surfaces 241 or respective second surfaces 242 facing each other in the z direction. According to this configuration, a dielectric layer 24 is sandwiched between two conductors with different potentials (the first conductor 21 and the first part 231), and an insulating layer 29 is sandwiched between two conductors with the same potential (two first conductors 21 or two first parts 231). Thus, when the multilayer capacitor A1 is energized, and when a potential difference is generated between the plurality of first conductors 21 and the plurality of first parts 231 (third conductor 23), voltage is applied in the thickness direction (z direction) of the dielectric layer 24, but little voltage is applied in the thickness direction (z direction) of the insulating layer 29. In this manner, the voltage applied to the insulating layer 29 in the thickness direction can be significantly reduced. Accordingly, the multilayer capacitor A1 is advantageous to suppressing the decrease in dielectric strength.

Further, in the multilayer capacitor A1, a second conductor 22 is in contact with the first surface 241 and a second part 232 (part of the third conductor 23) is in contact with the second surface 242. The second conductor 22 and the second part 232 sandwich the dielectric layer 24 in the z direction. Two adjacent laminate sections 20 of the plurality of laminate sections 20 in the z direction have respective first surfaces 241 or respective second surfaces 242 facing each other in the z direction. According to this configuration, the dielectric layer 24 is sandwiched between two conductors with different potentials (the second conductor 22 and the second part 232) and the insulating layer 29 is sandwiched between two conductors with the same potential (two second conductors 22 or two second parts 232). Therefore, when the multilayer capacitor A1 is energized, and when a potential difference is generated between the plurality of second conductors 22 and the plurality of second parts 232 (third conductor 23), voltage is applied to the dielectric layer 24 in the thickness direction (z direction), but little voltage is applied in the direction of the thickness of the insulating layer 29 (z direction). Thus, the voltage applied to the insulating layer 29 in the thickness direction can be significantly reduced. In this manner, the multilayer capacitor A1 can suppress the decrease in dielectric strength.

In the multilayer capacitor A1, the third conductor 23 of each multilayer section 20 includes a connecting part 230 that connects the relevant first part 231 and second part 232. Therefore, the first part 231 and the second part 232 are at the same potential. The third conductor 23 of each laminate section 20 is not exposed on any of the side surfaces 103-106 of the stacked body 10. According to this configuration, when a potential difference occurs between the first conductor 21 and the second conductor 22, each third conductor 23 is at a potential between the first conductor 21 and the second conductor 22. Thus, it is possible to more significantly suppress the voltage applied to the dielectric layer 24 between the first conductor 21 and the first part 231 and also the voltage applied to the dielectric layer 24 between the second conductor 22 and the second part 232 than when the first conductor 21 and the second conductor 22 are sandwiched by dielectric layers 24. Thus, the multilayer capacitor A1 is advantageous to suppressing dielectric breakdown of the dielectric layers 24.

According to the multilayer capacitor A1, in each laminate section 20, the dielectric layer 24 is, for example, made of a resin material. Conventional multilayer capacitors include ceramic capacitors in which the dielectric layer 24 is made of ceramics. Ceramics, due to their physical properties, are prone to cracking due to, for example, thermal stress. Therefore, the heat generated when the ceramic capacitor is energized may cause a crack in the dielectric layer 24 and destroy the dielectric layer. This breakdown reduces the dielectric strength of the dielectric layer 24. On the other hand, in the multilayer capacitor A1 of the present disclosure, since the dielectric layer 24 is not composed of ceramics, the generation of cracks due to thermal stress can be suppressed. Thus, the multilayer capacitor A1 is advantageous to suppressing the decrease in dielectric strength.

In the multilayer capacitor A1, each first conductor 21 has its end edge on the y1 direction side and the end edge on the y2 direction side covered with the insulator 25, respectively. Also, each second conductor 22 has the end edge on the y1 direction side and the end edge on the y2 direction side covered with the insulator 25, respectively. With this configuration, each first conductor 21 and each second conductor 22 are not exposed at the side surfaces 105, 106 of the stacked body 10. Thus, an unintended short circuit between each first conductor 21 and each second conductor 22 can be suppressed at the side surfaces 105, 106. Further, each third conductor 23 has an insulator 25 disposed around it in plan view. With this configuration, each third conductor 23 is not exposed at any one of the side surfaces 103-106 of the stacked body 10. Thus, an unintended short circuit between each third conductor 23 and each first conductor 21 or each second conductor 22 can be suppressed at any one of of the side surfaces 103-106.

FIGS. 13 to 17 show a multilayer capacitor A2 according to a second embodiment. The multilayer capacitor A2 differs from the multilayer capacitor A1 in that it has an additional pair of external electrodes 33, 34.

Figure 13:
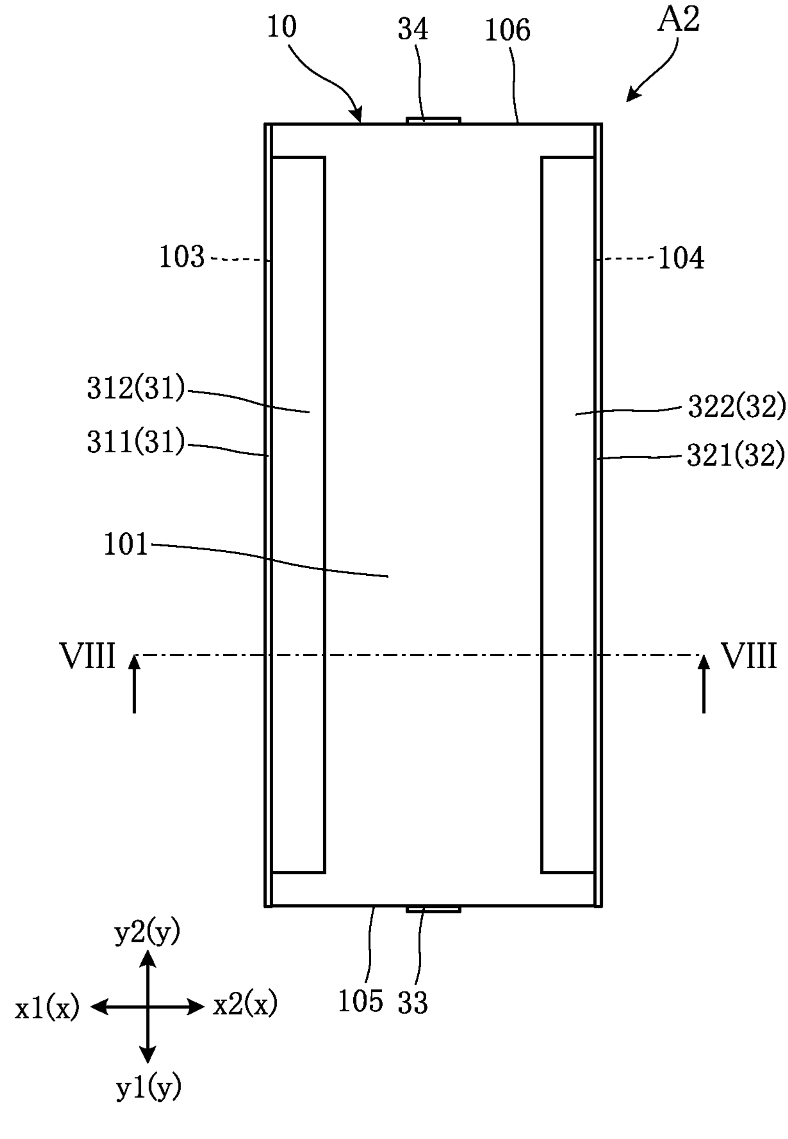
FIG. 13 is a plan view showing a multilayer capacitor according to a second embodiment.
Figure 14:
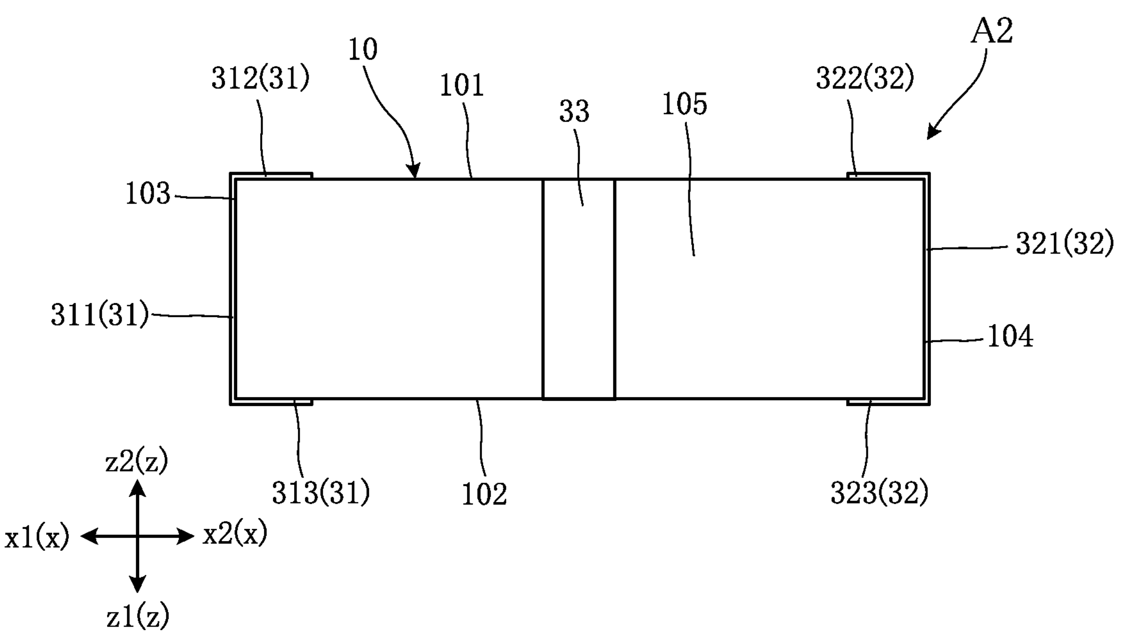
FIG. 14 is a front view showing the multilayer capacitor according to the second embodiment.
Figure 15:
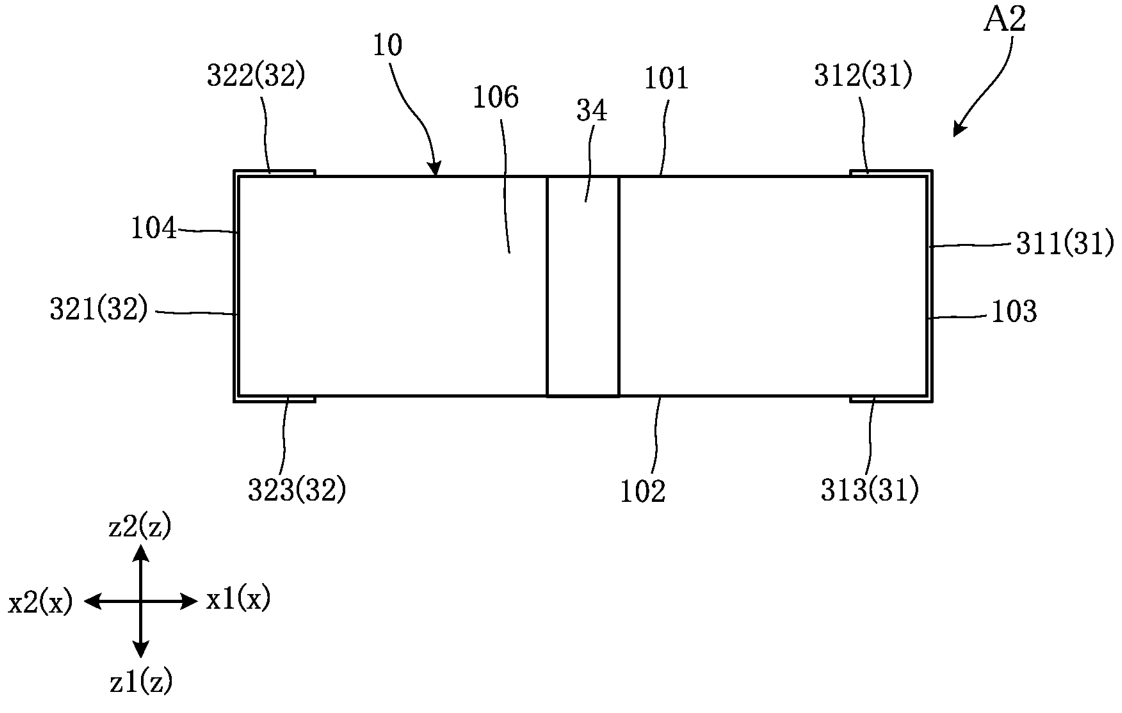
FIG. 15 is a rear view showing the multilayer capacitor according to the second embodiment.
Figure 16:
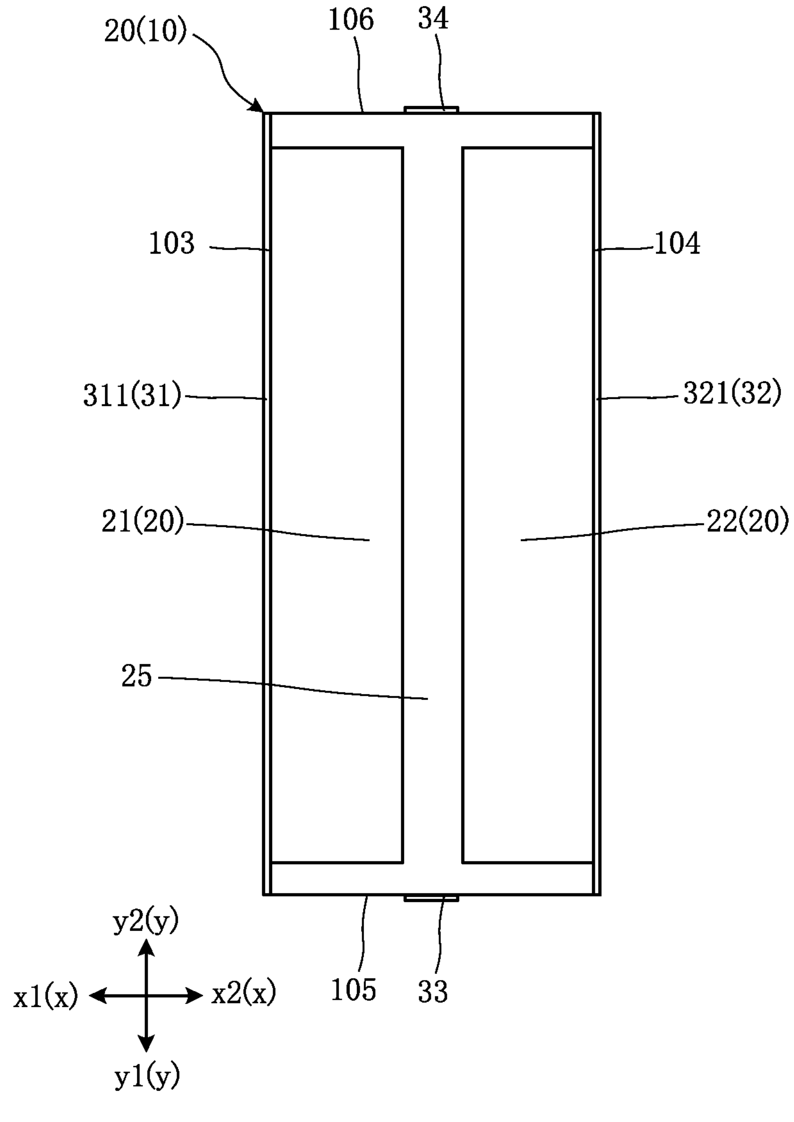
FIG. 16 is a plan view showing a layer including a first conductor and a second conductor of a stacked section according to the second embodiment.
Figure 17:
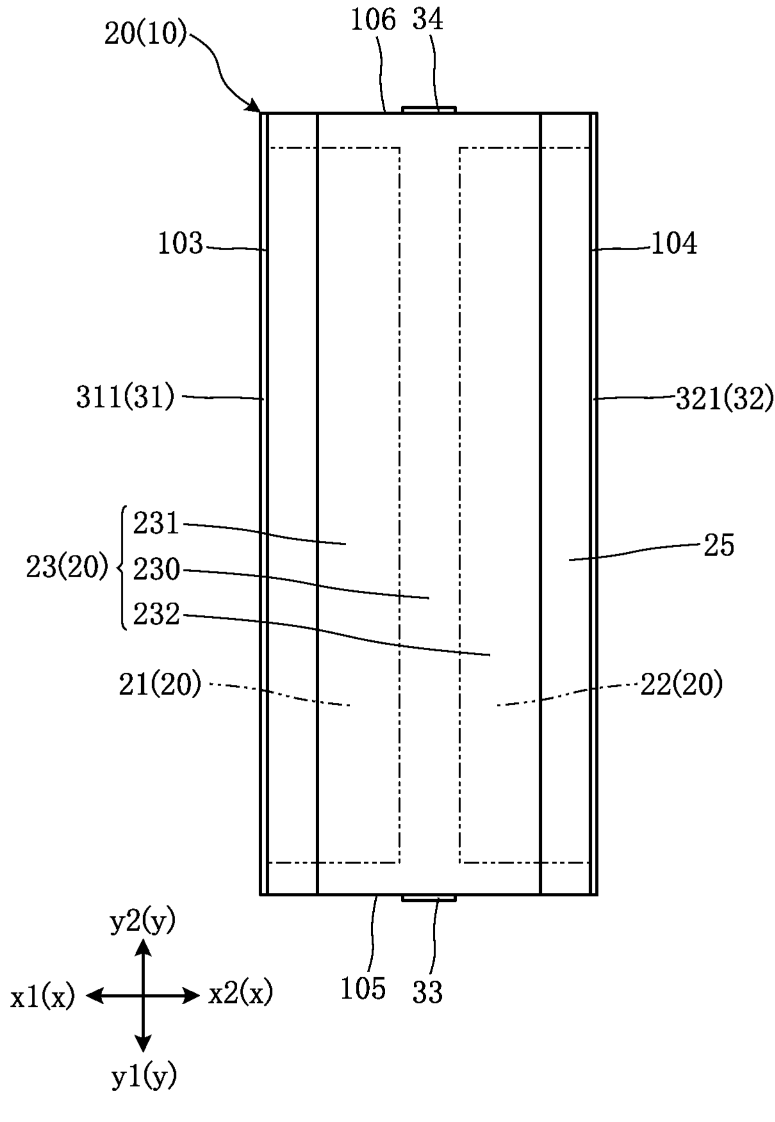
FIG. 17 is a plan view showing a layer including a third conductor of the stacked section according to the second embodiment.

FIG. 13 is a plan view of the multilayer capacitor A2. FIG. 14 is a front view of the multilayer capacitor A2. FIG. 15 is a rear view of the multilayer capacitor A2. FIG. 16 is a plan view of a layer of a laminate section 20 provided with a first conductor 21 and a second conductor 22. FIG. 17 is a plan view showing a layer of a laminate section 20 provided with a third conductor 23. For convenience of understanding, the first and second conductors 21 and 22 are shown as imaginary lines (double-dashed lines) in FIG. 17.

Each external electrode 33 and 34 is electrically connected to the third conductors 23. The external electrode 33 covers a portion of the side surface 105, as shown in FIG. 14, and the external electrode 34 covers a portion of the side surface 106, as shown in FIG. 15. Unlike this configuration, the external electrode 33 may further include a portion covering a portion of the obverse surface 101 and/or a portion covering a portion of the reverse surface 102. Similarly, the external electrode 34 may further include a portion covering a portion of the obverse surface 101 and/or a portion covering a portion of the reverse surface 102.

In each laminate section 20 of the multilayer capacitor A2, the third conductor 23 extends from the end edge in the y1 direction to the opposite end edge in the y2 direction, as shown in FIG. 17. The third conductor 23 is exposed at each side surface 105, 106. Thereby, as understood from FIG. 17, each third conductor 23 is connected to the external electrode 33 formed on the side surface 105 and to the external electrode 34 formed on the side surface 106.

In the multilayer capacitor A2, as in the multilayer capacitor A1, the first conductor 21 and the first part 231 sandwich the dielectric layer 24 in the z direction, and regarding two adjacent multilayer sections 20 in the z direction, their first surfaces 241, and their second surfaces 242 as well, face each other in the z direction. Thus, the multilayer capacitor A2, like the multilayer capacitor A1, can suppress the decrease in dielectric withstanding voltage.

The multilayer capacitor A2 noted above has two external electrodes 33, 34, and each external electrode 33, 34 is electrically connected to the third conductors 23 of the respective laminate sections 20. With this configuration, the potential of each third conductor 23 can be detected through the external electrodes 33, 34. Further, by applying an appropriate voltage to the external electrodes 33, 34, the potential of each third conductor 23 can be controlled. Thus, the potential of the third conductor 23 can be made larger or smaller than the potential of the first and second conductors 21 and 22. In addition, the first capacitor composed of the first conductor 21 and the first part 231 and the second capacitor composed of the second conductor 22 and the second part 232 can be connected in parallel. Thus, if one of the first and second capacitors fails, the other capacitor can be used for continued operation. In other words, the multilayer capacitor A2 has a fail-safe function. It is also possible to use multilayer capacitor A2 as a Y capacitor by connecting the third conductors 23 to ground (GND) through the external electrodes 33, 34.

In the second embodiment above, an example with two external electrodes 33, 34 is shown. However, the present disclosure is not limited to this and may be configured so that only one of the external electrodes is provided.

Figure 18:
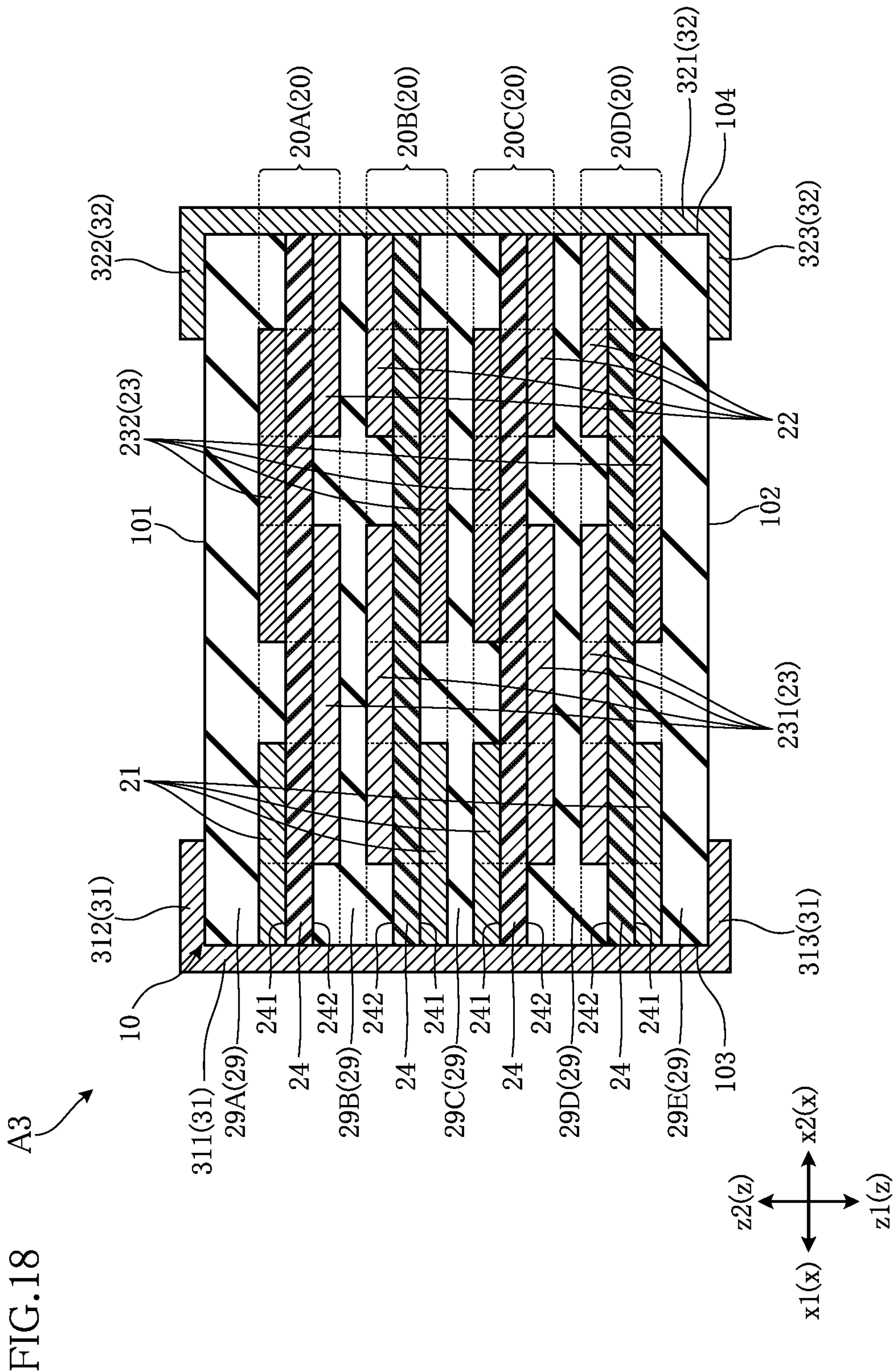
FIG. 18 is a cross-sectional view showing a multilayer capacitor according to the third embodiment.
Figure 19:
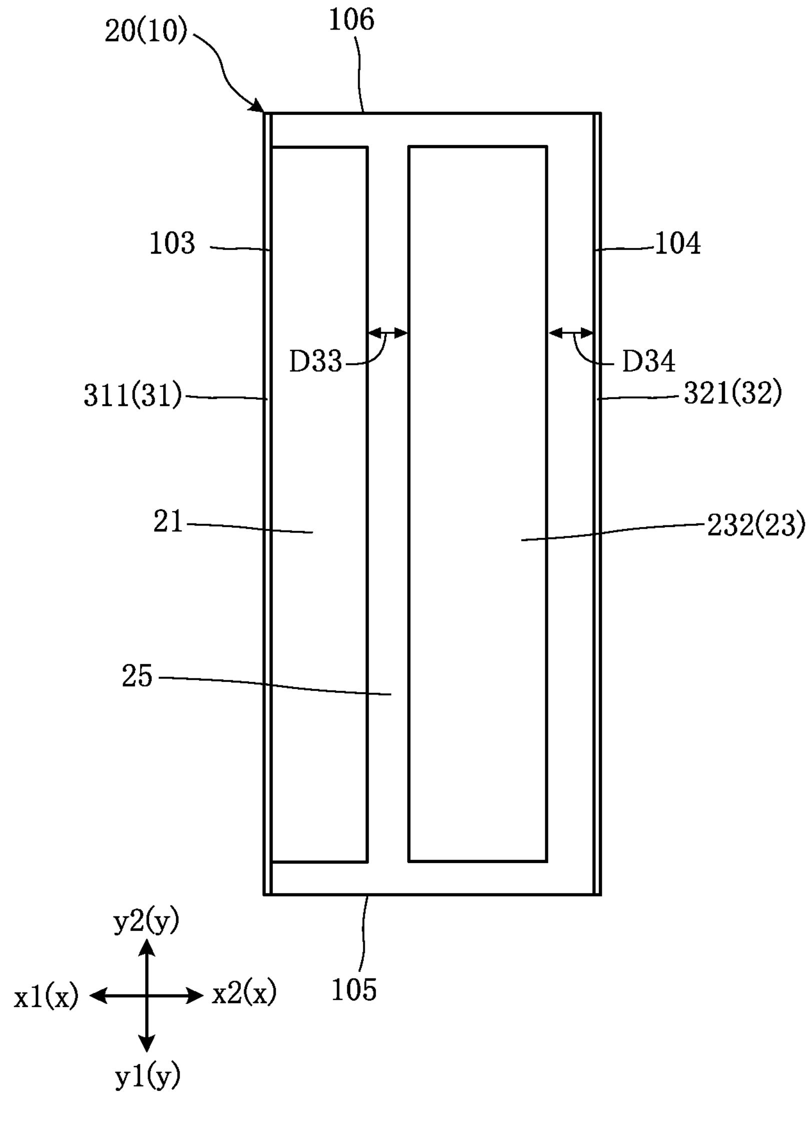
FIG. 19 is a plan view of a layer including the first conductor and the first part of the third conductor of the stacked section of the third embodiment.
Figure 20:
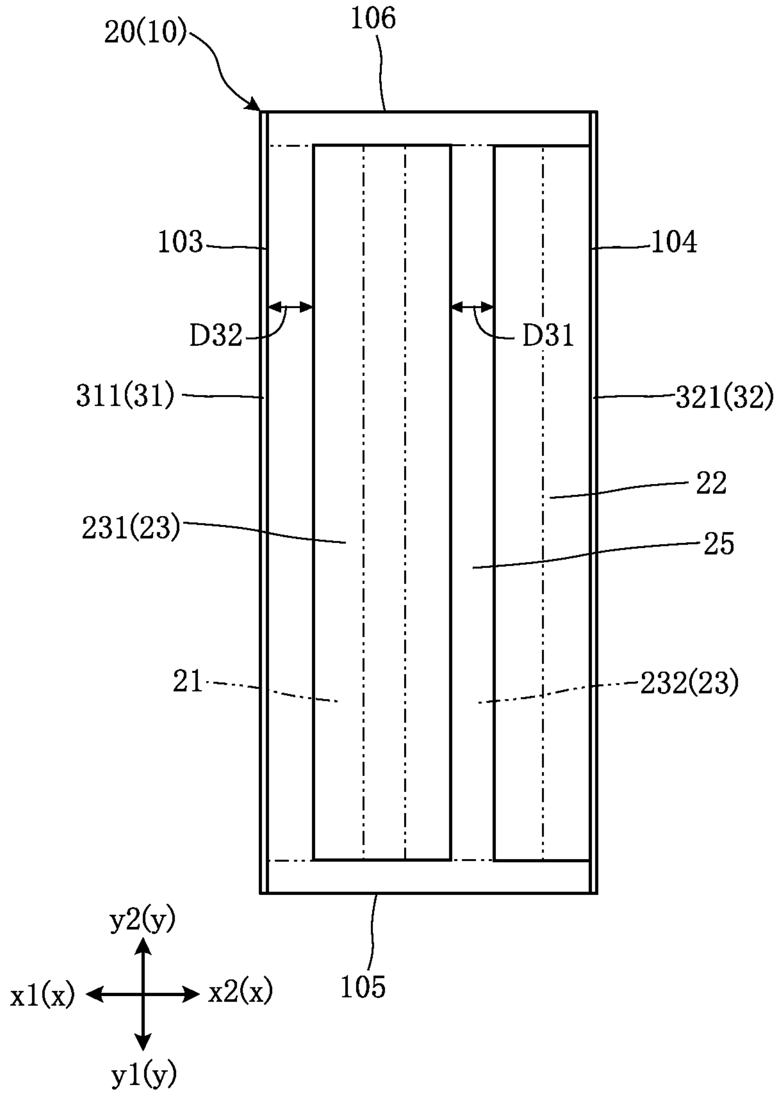
FIG. 20 is a plan view of a layer including the second conductor and the second part of the third conductor of the stacked section of the third embodiment.

FIGS. 18 through 20 show a multilayer capacitor A3 according to to a third embodiment. As shown in these figures, the multilayer capacitor A3 differs from the multilayer capacitor A1 in that the first part 231 and the second part 232 are spaced apart in each third conductor 23.

FIG. 18 shows a cross-sectional view of the multilayer capacitor A3, corresponding to the cross-section of FIG. 8. FIG. 19 shows a plan view of a layer of each laminate section 20 provided with a first conductor 21 and the second part 232 of a third conductor 23. FIG. 20 is a plan view of a layer of each laminate section 20 provided with a second conductor 22 and the first part 231 of a third conductor 23. For convenience of understanding, the first conductor 21 and the second part 232 are shown as imaginary lines (double-dashed lines) in FIG. 20.

Each third conductor 23 in the multilayer capacitor A3 does not include a connecting part 230, as described above, and the first part 231 and the second part 232 are spaced apart from each other.

As shown in FIG. 18, a first part 231 is in contact with the second surface 242 of a dielectric layer 24. Thus, the first part 231 and a second conductor 22 are in contact with the second surface 242. The first part 231 and the second conductor 22 are arranged in the x direction across an insulator 25 in plan view. The first part 231 is further located in the x1 direction than the second conductor 22. The separation distance D31 (see FIG. 20) in the x direction between the first part 231 and the second conductor 22 is provided so that no dielectric breakdown occurs in the insulator 25 positioned between the first part 231 and the second conductor 22. The separation distance D32 (see FIG. 20) in the x direction between the first part 231 and the side surface covering portion 311 (external electrode 31) is provided so that no dielectric breakdown occurs in the insulator 25 disposed between the first part 231 and the side surface covering portion 311.

As shown in FIG. 18, a second part 232 is in contact with the first surface 241 of a dielectric layer 24. Thus, the second part 232 and a first conductor 21 are in contact with the first surface 241. The second part 232 and the first conductor 21 are arranged in the x direction across an insulator 25 in plan view. The second part 232 is further located in the x2 direction than the first conductor 21. The separation distance D33 in the x direction between the second part 232 and the first conductor 21 (see FIG. 19) is provided so that no dielectric breakdown occurs in the insulator 25 positioned between the second part 232 and the first conductor 21. The separation distance D34 (see FIG. 19) in the x direction between the second part 232 and the side surface covering portion 321 (external electrode 32) is provided so that no dielectric breakdown occurs in the insulator 25 disposed between the second part 232 and the side surface covering portion 321.

As shown in FIG. 18, the first part 231 and the second part 232 are located on the mutually opposite sides across the intervening dielectric layer 24 in the z direction. The first part 231 incudes a portion overlapping with the first conductor 21 in plan view and another portion overlapping with the second part 232 in plan view. Likewise, the second part 232 includes a portion overlapping with the second conductor 22 in plan view and a portion overlapping with the first part 231 in plan view.

When a potential difference occurs between the first conductor 21 and the second conductor 22 in each laminate section 20 of the multilayer capacitor A3, a capacitor is formed with the first conductor 21 as one electrode plate and the first part 231 as the other electrode plate. Likewise, a second capacitor is formed with the first part 231 as one electrode plate and the second part 232 as the other plate, and a third capacitor is formed with the second part 232 as one electrode plate and the second conductor 22 as the other electrode plate. In each laminate section 20, three capacitors are connected in series between the first conductor 21 and the second conductor 22. The capacitance of the laminate section 20 is the sum of the capacitances of these three capacitors. In the multilayer capacitor A3, as understood from FIGS. 18 and 20, there are three areas, i.e., the area where the first conductor 21 and the first part 231 overlap with each other in plan view, the area where the first part 231 and the second part 232 overlap with each other in plan view, and the area where the second part 232 and the second conductor 22 overlap with each other. These areas are substantially the same in greatness. Therefore, the capacitance of each of the three series-connected capacitors is substantially the same. Unlike this example, it is also possible to provide different capacitances for the three capacitors by adjusting the above three areas as needed.

In the multilayer capacitor A3, as in the multilayer capacitor A1, the first conductor 21 and the first part 231 sandwich a dielectric layer 24 in the z direction. Also, with respect to two adjacent laminate sections 20 in the z direction among the plurality of laminate sections 20, their respective first surfaces 241 or second surfaces 242 face each other in the z direction. Thus, the multilayer capacitor A3, like the multilayer capacitor A1, is advantageous to suppressing the decrease in dielectric strength.

According to the third embodiment, as in the second embodiment, there may be further provided a pair of external electrodes 33 and 34 connected to the third conductor 23. In this case, one of the external electrodes 33 and 34 may be connected to one of the first part 231 and second part 232, while the other external electrode 33, 34 may be connected to the other of the first part 231 and the second part 232. If the first part 231 is connected to the external electrode 33 and the second part 232 is connected to the external electrode 34, the first part 231 is not exposed from the side surface 106 and is insulated from the external electrode 34, and the second part 232 is not exposed from the side surface 105 and is insulated from the external electrode 33. As another example, both the external electrodes 33 and 34 may be connected to either one of the first part 231 or the second part 232. If the first part 231 is connected to the two external electrodes 33, 34, the second part 232 is not exposed from the side surfaces 105, 106 and is insulated from the two external electrodes 33, 34.

The third embodiment above illustrates an example where each third conductor 23 is made up of two portions (first part 231 and second part 232) that are spaced apart from each other and located across a dielectric layer 24. As another example, each third conductor 23 may have three or more separate parts. In such an instance, the three or more parts may be alternately arranged with an intervening dielectric layer 24, as understood from the configuration of the multilayer capacitor A1 or the multilayer capacitor A3.

Figure 21:
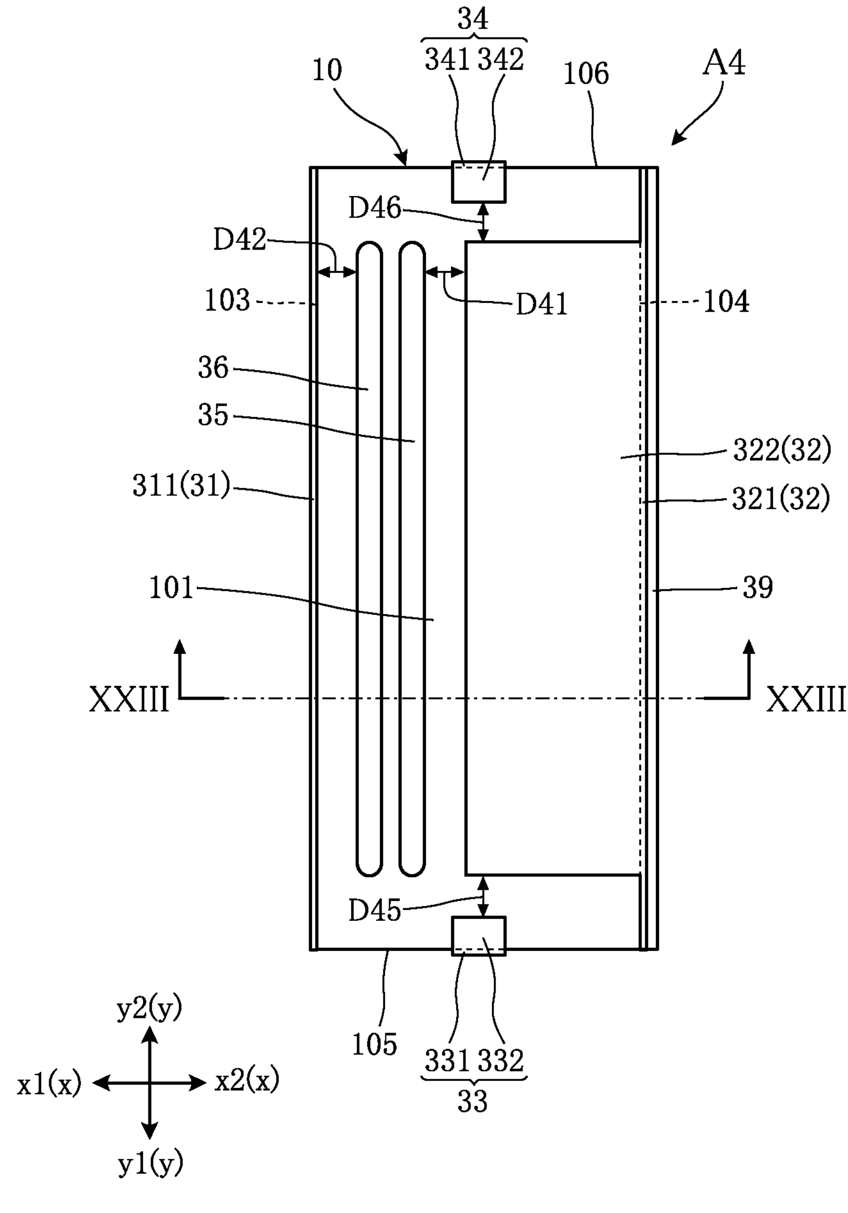
FIG. 21 is a plan view showing a multilayer capacitor according to a fourth embodiment.
Figure 22:
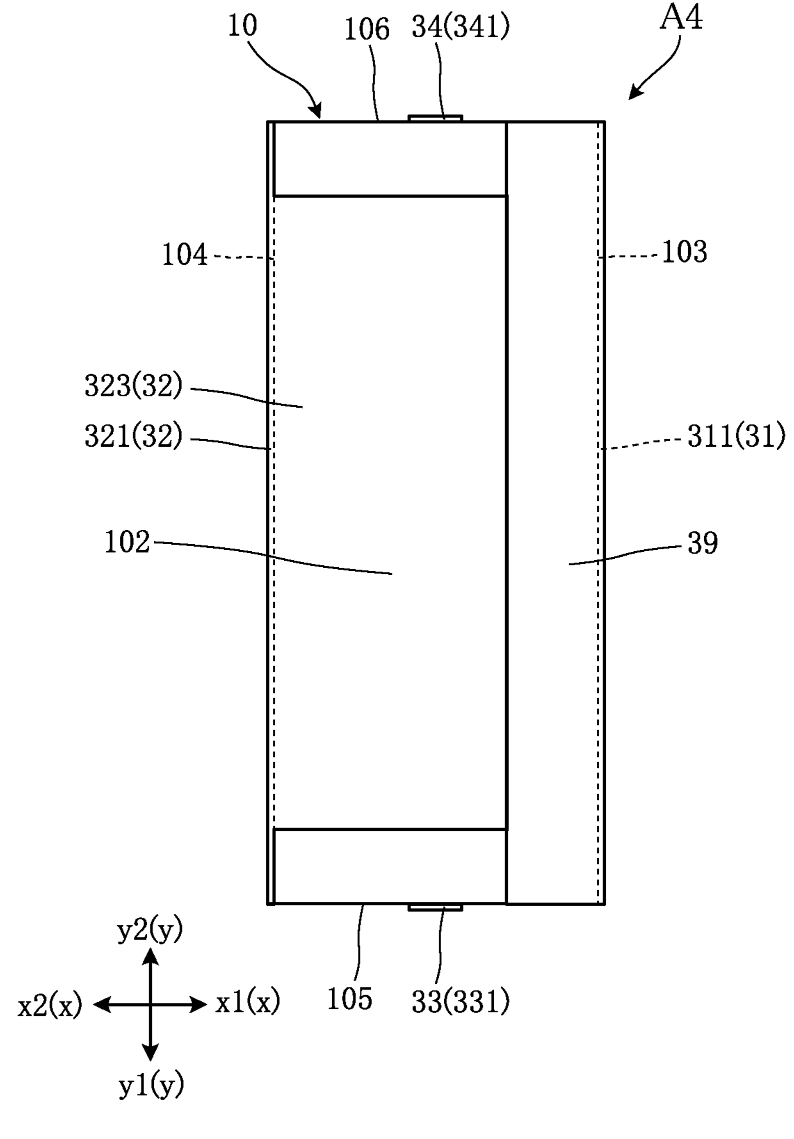
FIG. 22 is a bottom view showing the multilayer capacitor according to the fourth embodiment.
Figure 23:
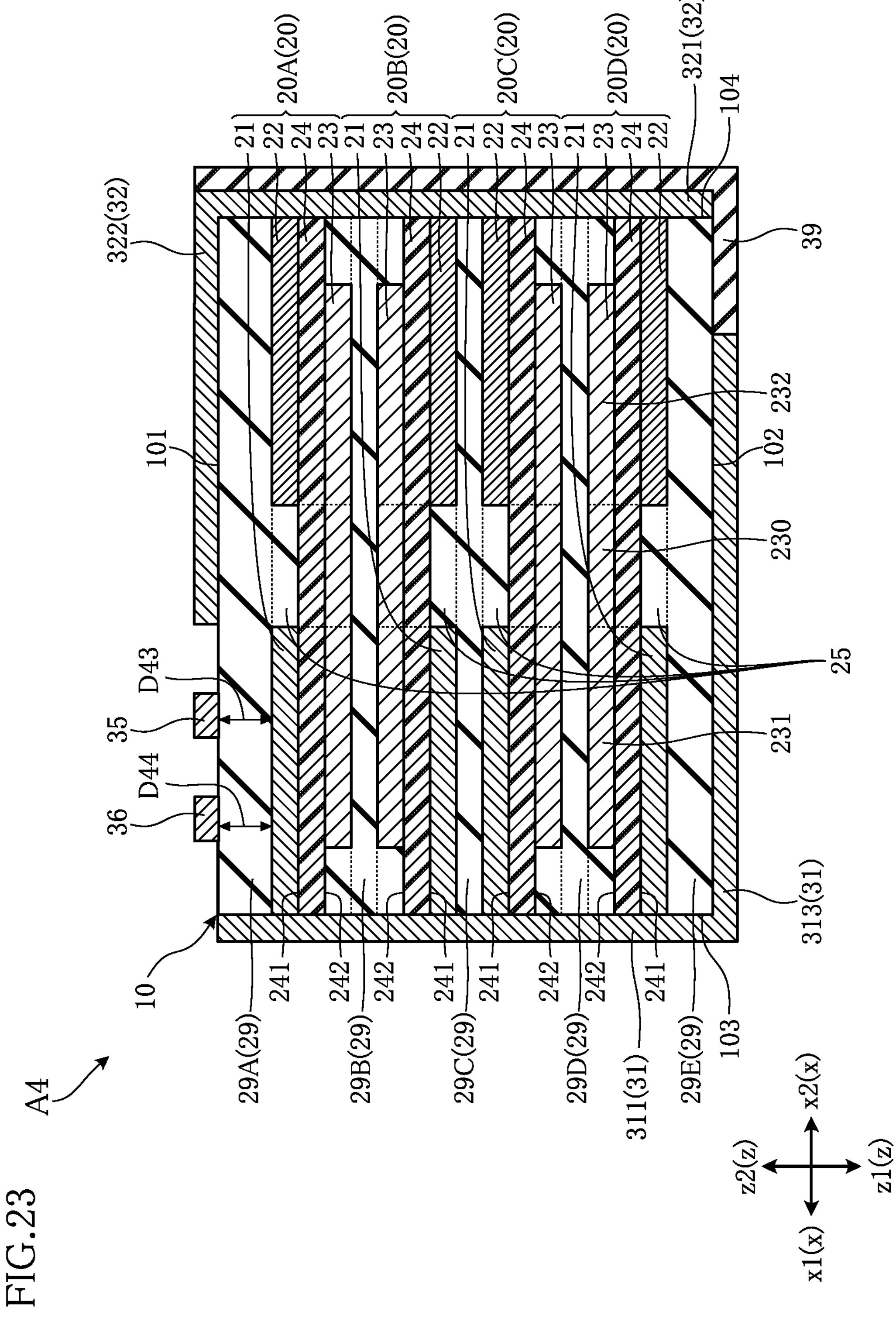
FIG. 23 is a cross-sectional view along the XXIII-XXIII line of FIG. 21.

FIGS. 21 to 23 show a multilayer capacitor A4 according to a fourth embodiment. As shown in these figures, the multilayer capacitor A4 differs from the multilayer capacitor A1 in that two wiring layers 35, 36 are formed on the obverse surface 101 of the stacked body 10.

FIG. 21 is a plan view of the multilayer capacitor A4. FIG. 22 is a bottom view of the multilayer capacitor A4. FIG. 23 is a cross-sectional view along XXIII-XXIII line of FIG. 21.

As shown in FIGS. 21 and 23, two wiring layers 35, 36 are formed on the obverse surface 101 of the stacked body 10. Each wiring layer 35, 36 is made of Cu or Cu alloy. The wiring layers 35, 36 are strip-shaped in plan view, extending to be elongated in the y direction. The two wiring layers 35, 36 are arranged substantially parallel to each other. The separation distance D41 (see FIG. 21) in the x direction between the wiring layer 35 and the external electrode 32 (the obverse surface covering portion 322) is set so that the wiring layer 35 and the external electrode 32 do not short circuit. The separation distance D42 (see FIG. 21) in the x direction between the wiring layer 36 and the external electrode 31 (the obverse surface covering portion 312) is set so that the wiring layer 36 and the external electrode 31 do not short-circuit. In addition, the separation distance D43 in the z direction between the wiring layer 35 and the first conductor 21 of the laminate section 20A (see FIG. 23) and the separation distance D44 in the z direction between the wiring layer 36 and the first conductor 21 of the laminate section 20A (see FIG. 23), in other words, the thickness of the insulating layer 29A in the z direction, are set so that each wiring layer 36, 35 does not short-circuit with the first conductor 21 of the laminate section 20A.

In the multilayer capacitor A4, the external electrode 31 includes a side surface covering portion 311 and a reverse surface covering portion 313, but does not include an obverse surface covering portion 312, as shown in FIGS. 21 through 23. As can be understood from FIGS. 22 and 23, the reverse surface covering portion 313 in this embodiment is greater in area than the reverse surface covering portion 313 of the multilayer capacitor A1. In particular, in the multilayer capacitor A4, the reverse surface covering portion 313 overlaps with the second conductor 22 of the laminate section 20D in plan view, as shown in FIG. 23. Thus, the thickness of the insulating layer 29E is set in light of the potential difference between the reverse surface covering portion 313 (external electrode 31) and the second conductor 22 of the laminate section 20D, so that dielectric breakdown does not occur in the insulating layer 29E. In one example, the thickness of the insulating layer 29E is about 2.5 to 3 times the thickness of the insulating layer 29D. The outer electrode 32 includes a side surface covering portion 321 and an obverse surface covering portion 322, but does not include a reverse surface covering portion 323, as shown in FIGS. 21 to 23. As can be understood from FIGS. 21 and 23, the obverse surface covering portion 322 in this embodiment is greater in area than the obverse surface covering portion 322 of the multilayer capacitor A1. The configurations (e.g., shape and extent of formation) of each external electrode 31, 32 shown in FIGS. 21 to 23 may be applied to the multilayer capacitors A1 to A3.

In the multilayer capacitor A4, the external electrode 33 includes a side surface covering portion 331 and an obverse surface covering portion 332, as shown in FIGS. 21 and 22. The side surface covering portion 331 covers a portion of the side surface 105 of the stacked body 10. The side surface covering portion 331 is electrically connected to the third conductors 23, as with the external electrode 33 of the multilayer capacitor A2. The obverse surface covering portion 332 covers a portion of the obverse surface 101 of the stacked body 10. The separation distance D45 (see FIG. 21) in the y direction between the obverse surface covering portion 332 and the external electrode 32 (obverse surface covering portion 322) is provided so that the external electrode 33 and the external electrode 32 do not short circuit. Alternatively, the external electrode 33 may not include the obverse surface covering portion 332, but may include the side surface covering portion 331.

In the multilayer capacitor A4, the external electrode 34 includes a side surface covering portion 341 and an obverse surface covering portion 342, as shown in FIGS. 21 and 22. The side surface covering portion 341 covers a portion of the side surface 106 of the stacked body 10. The side surface covering portion 341 is electrically connected to the third conductors 23, as with the external electrode 34 of the multilayer capacitor A2. The obverse surface covering portion 342 covers a portion of the obverse surface 101 of the stacked body 10. The separation distance D46 (see FIG. 21) in the y direction between the obverse surface covering portion 342 and the external electrode 32 (obverse surface covering portion 322) is provided so that the external electrode 34 and the external electrode 32 do not short circuit. The external electrode 34 may not include the obverse surface covering portion 342, but may include the side surface covering portion 341.

Use is made of an insulating film or layer 39 made of an insulating resin material, for example. The insulating film 39 may cover a region close or adjacent to the corner where the reverse surface 102 and the side surface 104 of the stacked body 10 connect to each other, as shown in FIG. 23. Provided on the reverse surface 102, the insulating film 39 insulates the external electrode 31 (reverse surface covering portion 313) and the external electrode 32 (side surface covering portion 321) from each other, thereby preventing a short circuit between the external electrodes 31 and 32. The area for forming the insulating film 39 is not limited to that of the example shown in FIGS. 21 to 23.

In the multilayer capacitor A4, as in the multilayer capacitor A1, a first conductor 21 and a first part 231 sandwich a dielectric layer 24 in the z direction, and regarding two adjacent laminate sections 20 of the plurality of laminate sections 20 in the z direction, their first surfaces 241 or their second surfaces 242 face each other in the z direction. Thus, the multilayer capacitor A4, like the multilayer capacitor A1, is advantageous to suppressing the decrease the decrease in dielectric strength.

The multilayer capacitor A4 has two wiring layers 35, 36. The wiring layers 35, 36 are not electrically connected to the first conductors 21, the second conductors 22 and the third conductors 23 inside the stacked body 10. In this configuration, the multilayer capacitor A4 can be used as a wiring substrate incorporating a built-in capacitor.

In the above example of the fourth embodiment, the third conductor 23 of each laminate section 20 has a first part 231 and a second part 232 connected to each other by a connecting part 230. Alternatively, the first part 231 and the second part 232 may be spaced apart from each other, as in the multilayer capacitor A3 of the third embodiment.

Next, examples of the use of multilayer capacitors of the present disclosure will be described.

FIGS. 24 to 33 show a semiconductor device B1 equipped with the above-noted multilayer capacitor A4. As shown in these figures, the semiconductor device B1 includes, in addition to the multilayer capacitor A4, a plurality of switching elements 4A, 4B, a support substrate 5, a signal substrate 6B, two input terminals 71, 72, an output terminal 73, a plurality of signal terminals 74A to 77A and 74B to 77B, a plurality of connecting members 81 to 85, and a sealing member 9.

Figure 24:
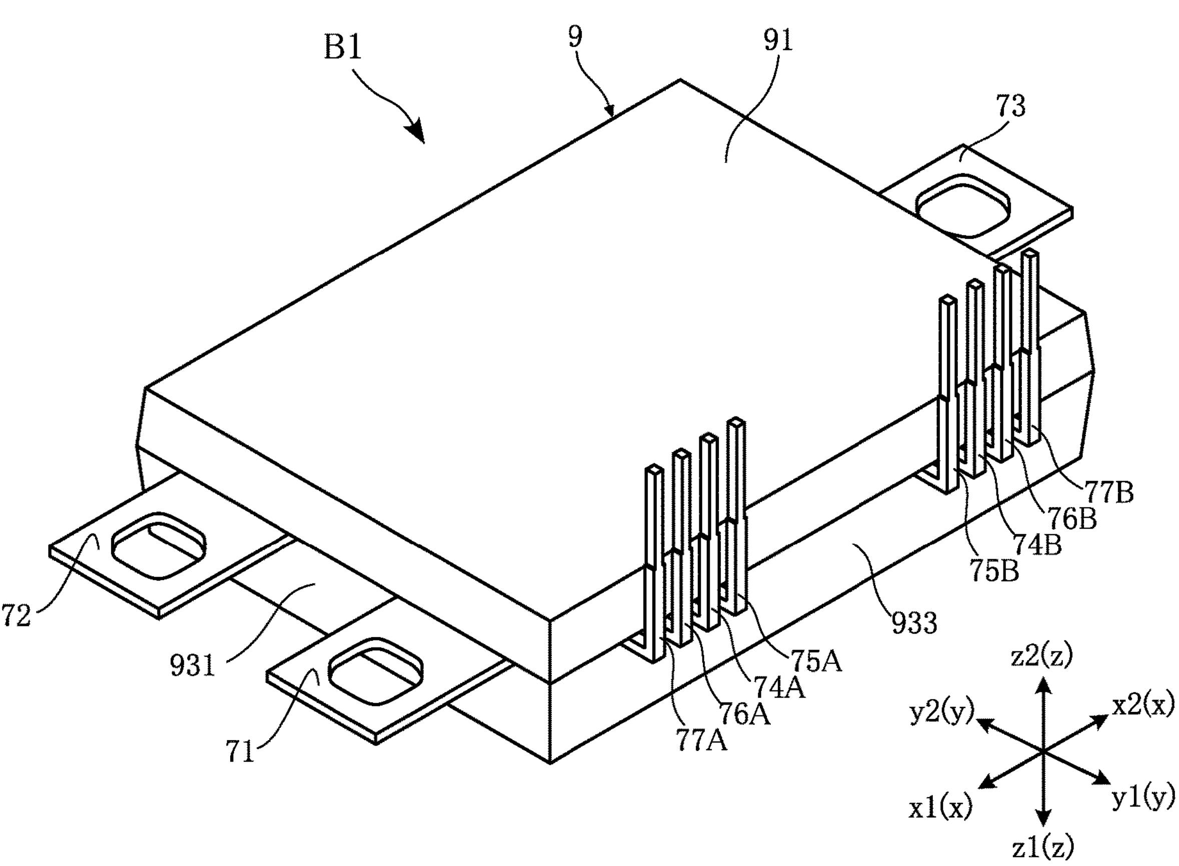
FIG. 24 is a perspective view of a semiconductor device of the present disclosure.
Figure 25:
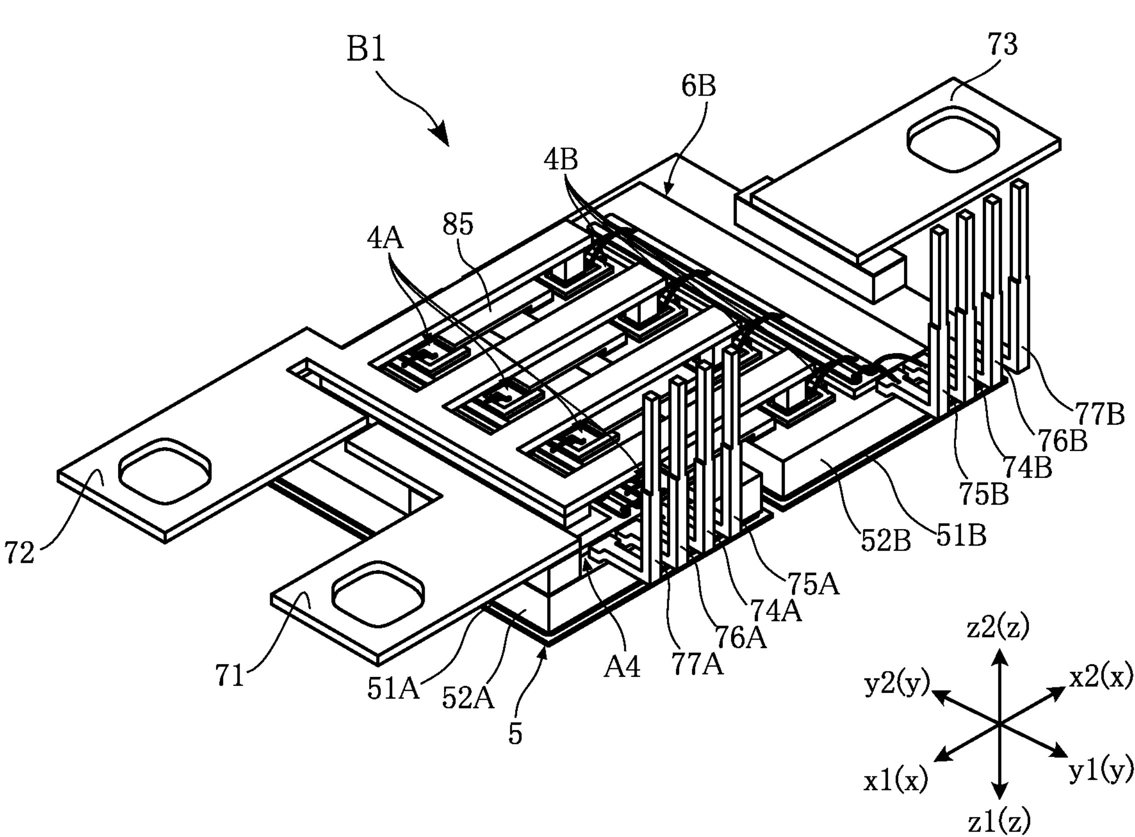
FIG. 25 is a perspective view of FIG. 24, in which the sealing member is omitted.
Figure 26:
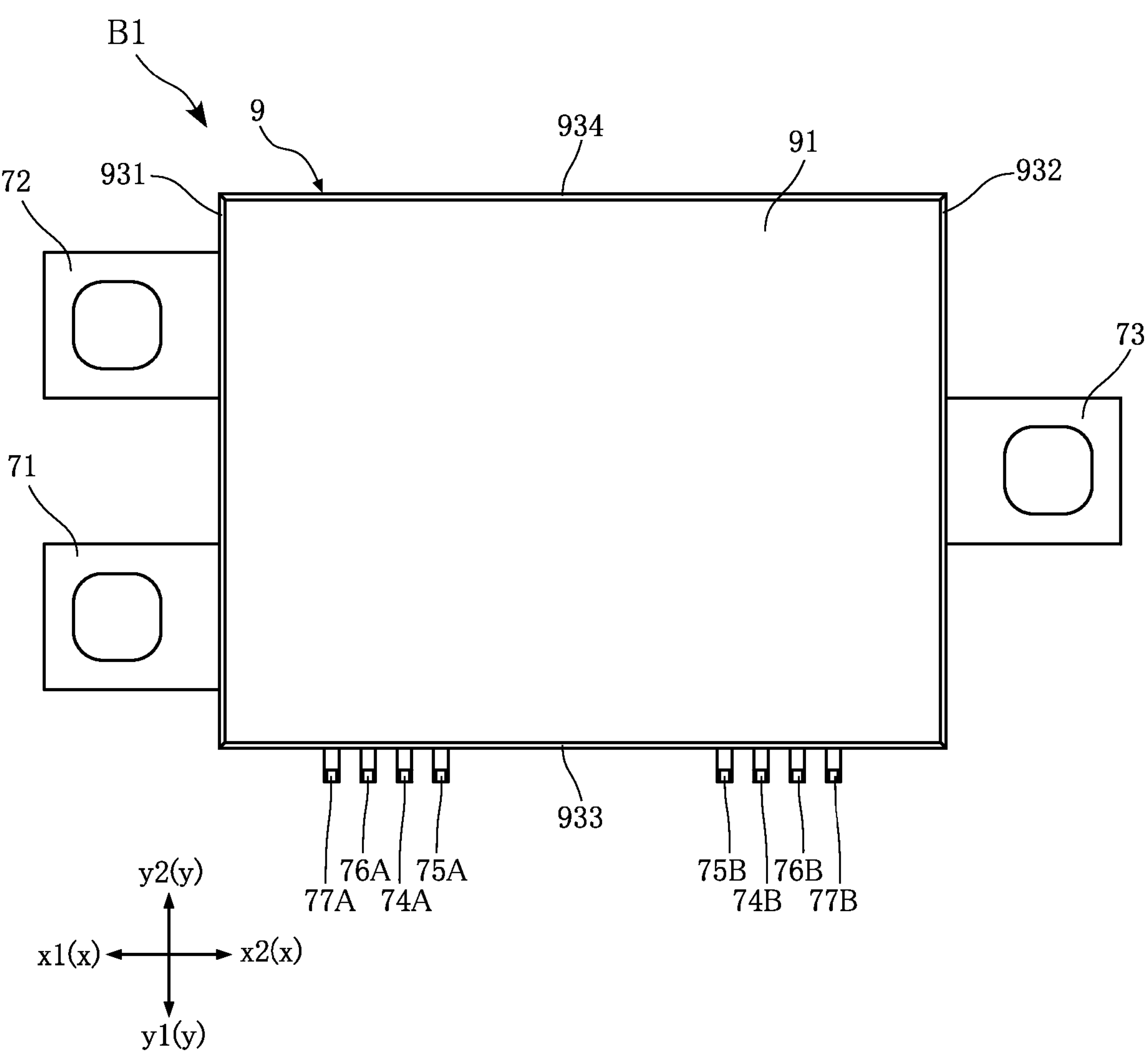
FIG. 26 is a plan view showing the semiconductor device of the present disclosure.
Figure 27:
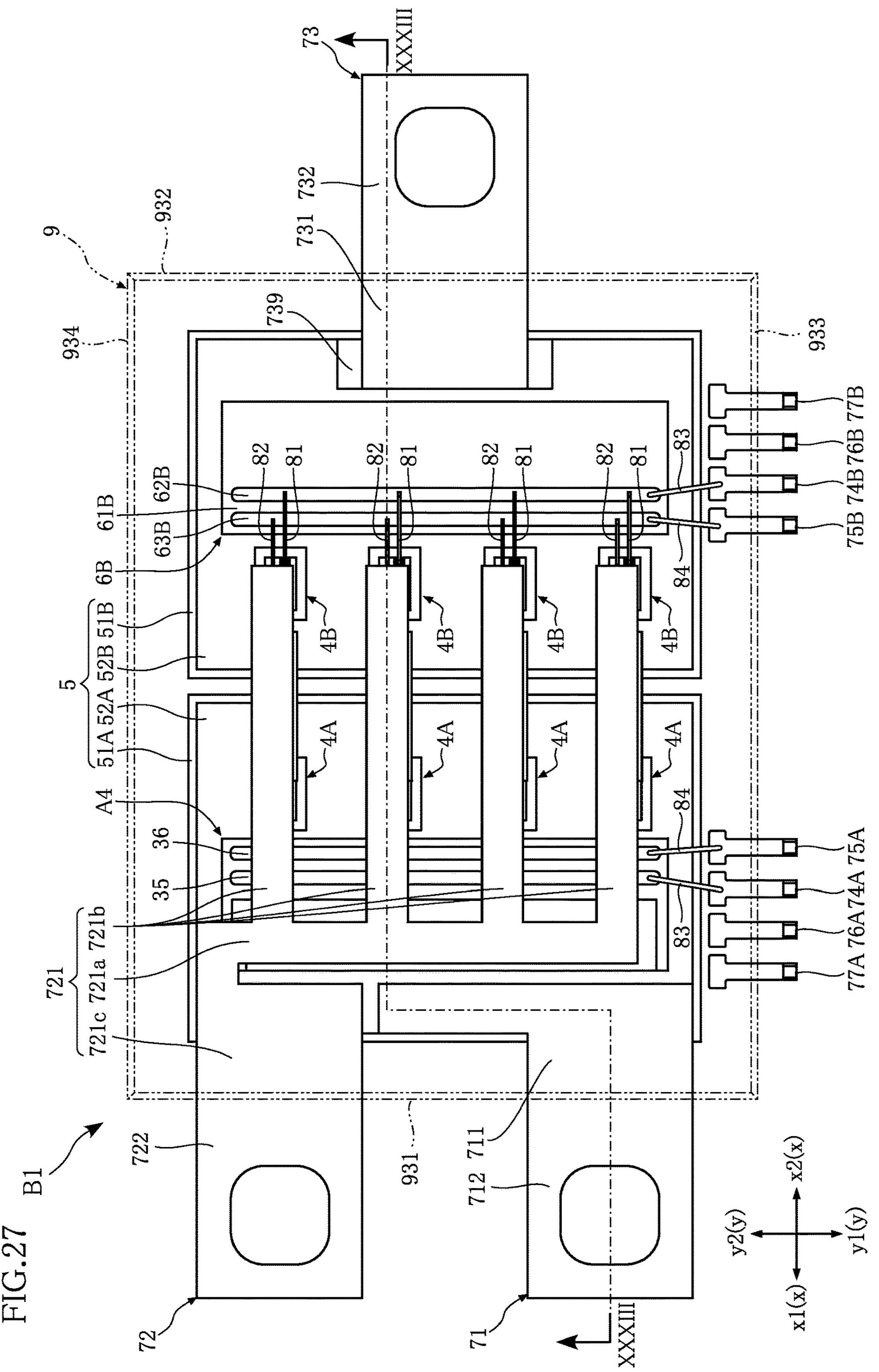
FIG. 27 is a plan view of FIG. 26, in which the sealing member is shown as an imaginary line (double-dotted line).
Figure 28:
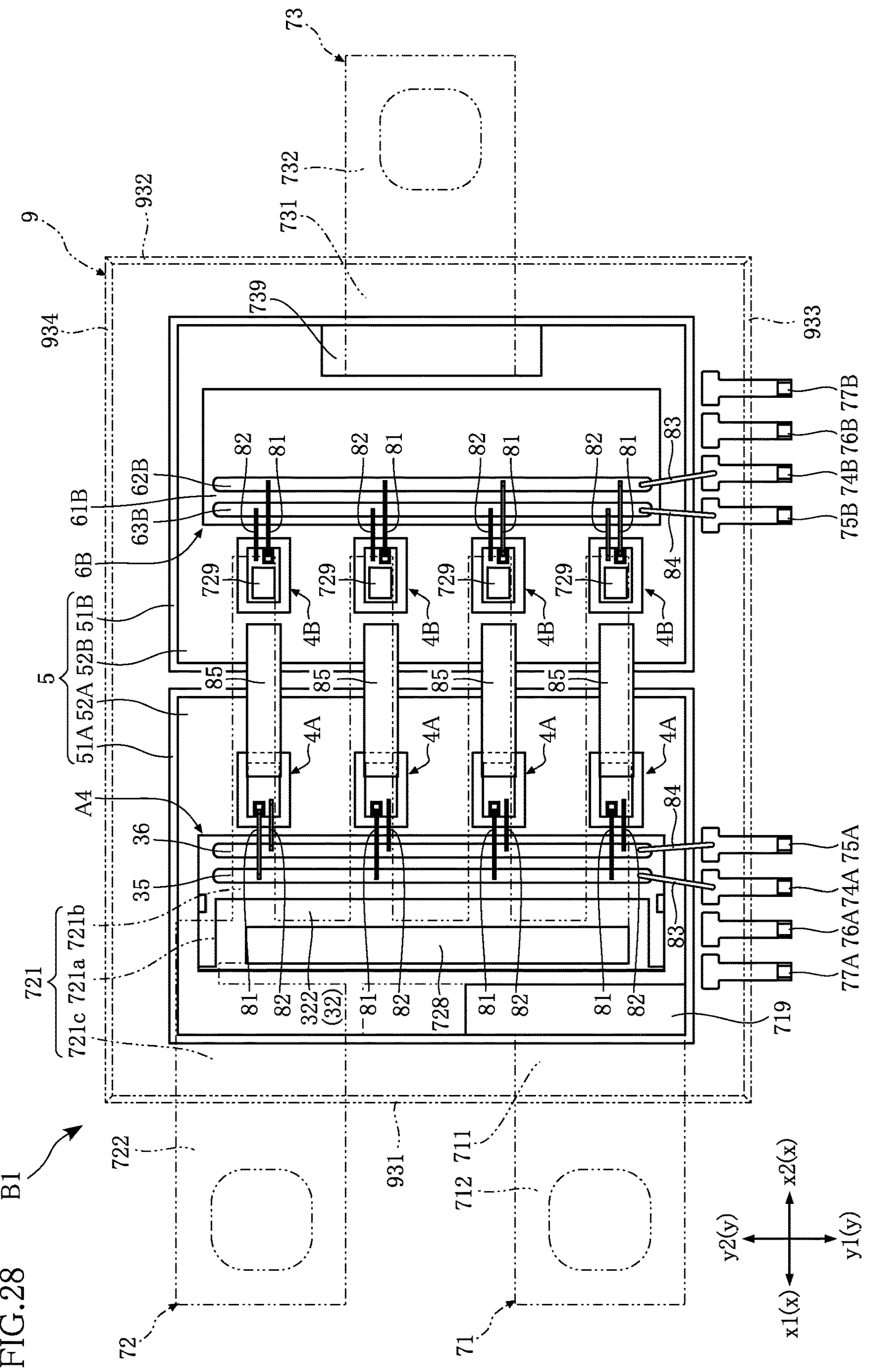
FIG. 28 shows, in the plan view of FIG. 27, two input terminals and an output terminal with imaginary lines (double-dotted lines).
Figure 29:
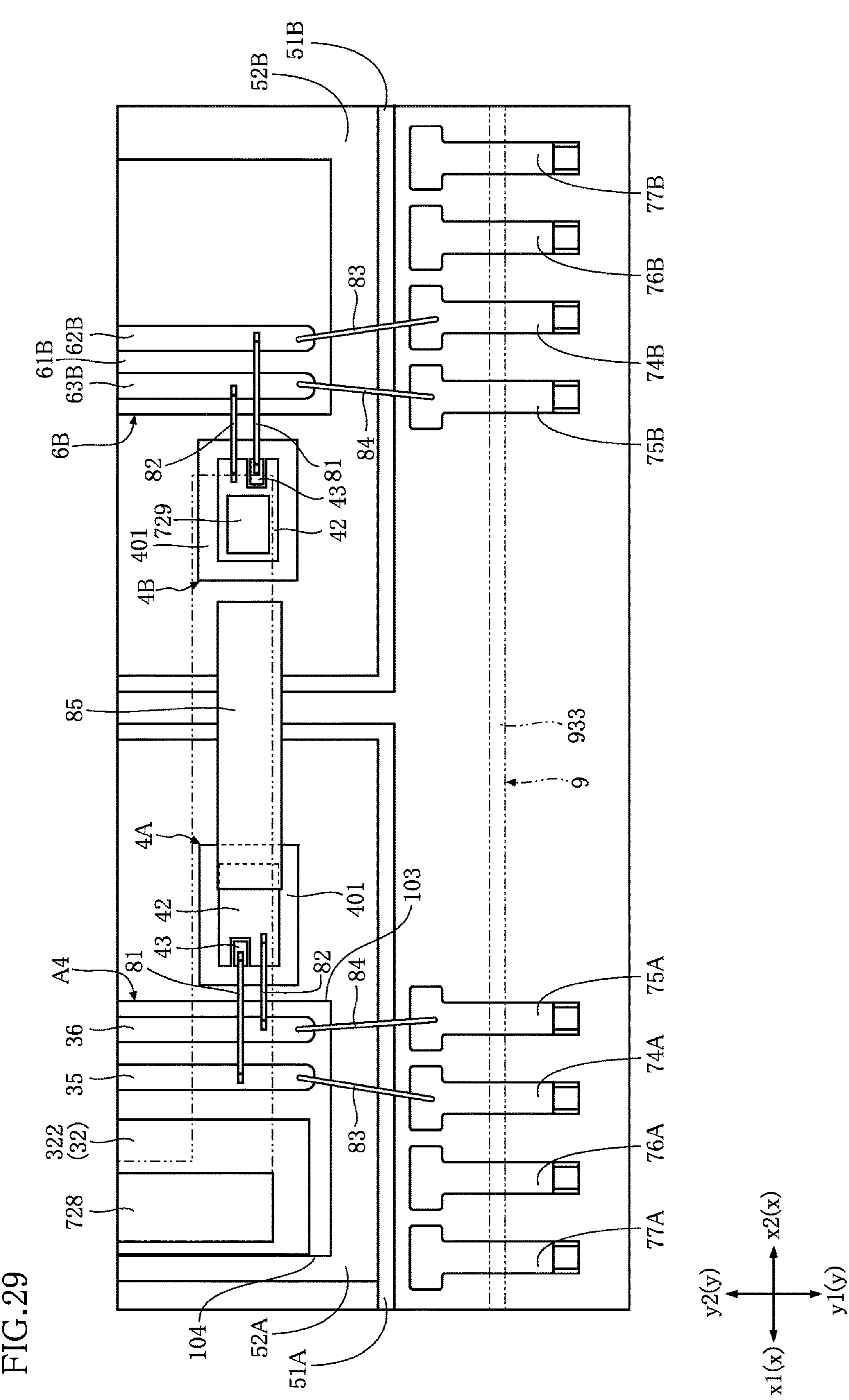
FIG. 29 is a partially enlarged view of FIG. 28.
Figure 30:
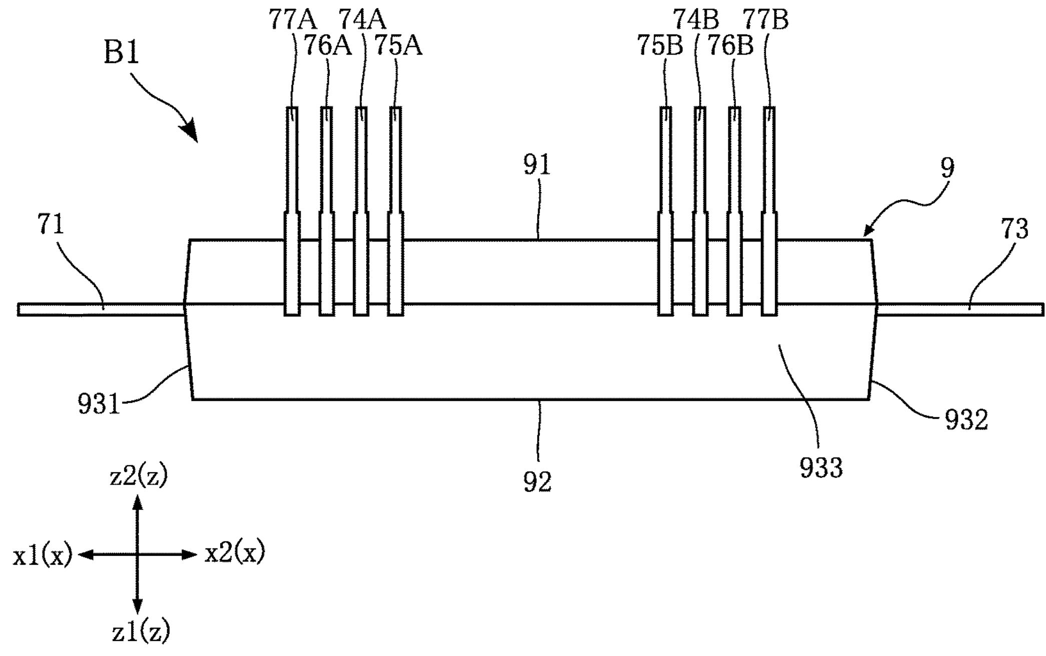
FIG. 30 is a front view of the semiconductor device of the present disclosure.
Figure 31:
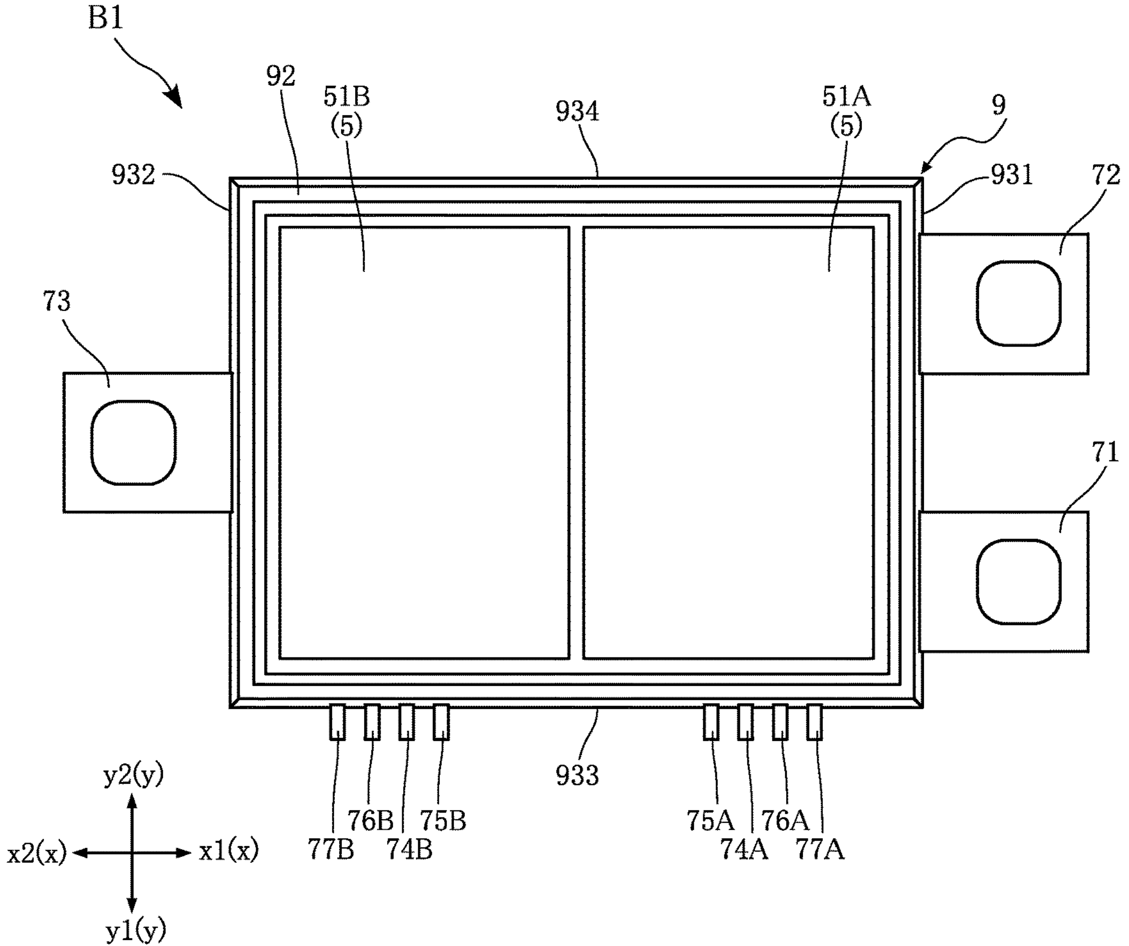
FIG. 31 is a bottom view showing the semiconductor device of the present disclosure.
Figure 32:
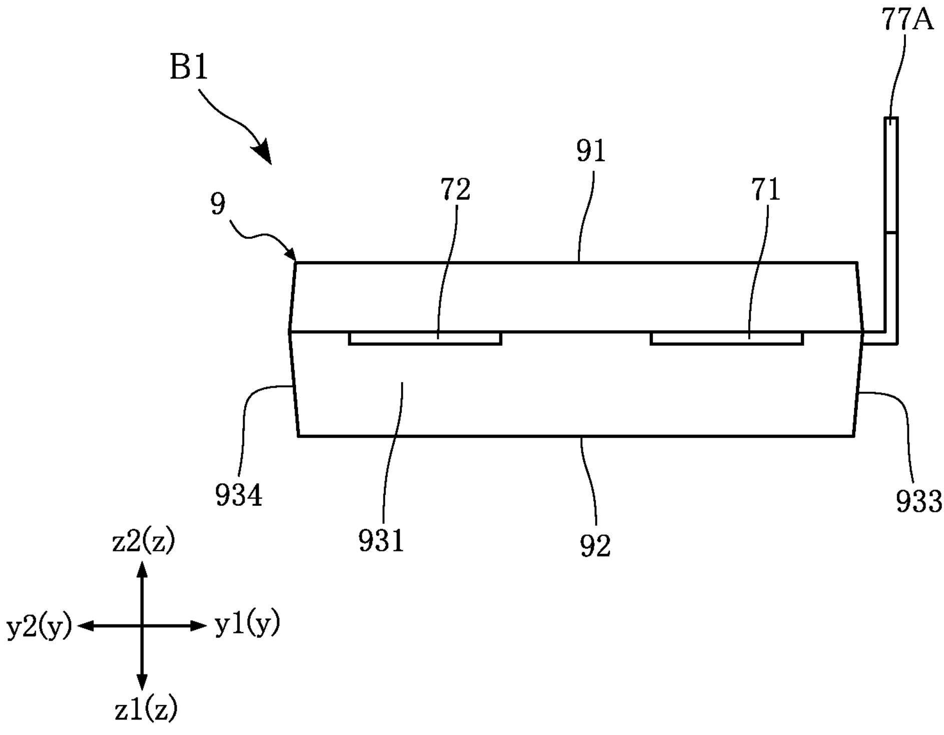
FIG. 32 is a side view (left side view) showing the semiconductor device of the present disclosure.
Figure 33:
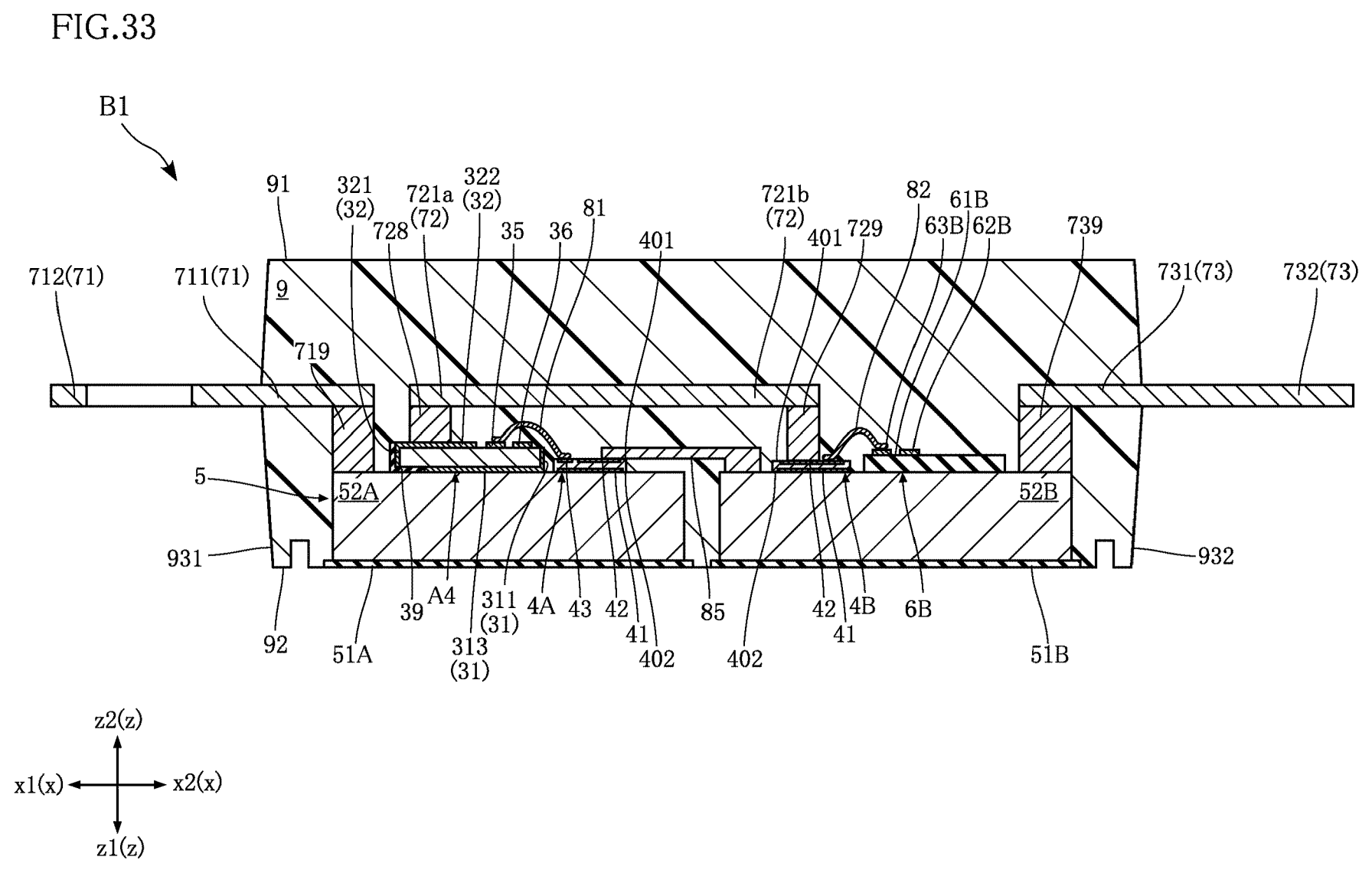

FIG. 24 is a perspective view of the semiconductor device B1. FIG. 25 corresponds to the perspective view of FIG. 24 with the sealing member 9 omitted. FIG. 26 is a plan view showing the semiconductor device B1. FIG. 27 corresponds to the plan view of FIG. 26, with the sealing member 9 shown with an imaginary line (double-dotted line). FIG. 28 corresponds to the plan view of FIG. 27 with the two input terminals 71, 72 and the output terminal 73 shown with imaginary lines (double-dotted lines). FIG. 29 is an enlarged partial view of FIG. 28. FIG. 30 is a front view of the semiconductor device B1. FIG. 31 is a bottom view of the semiconductor device B1. FIG. 32 is a side view (left side view) showing the semiconductor device B1. FIG. 33 is a cross-sectional view along XXXIII-XXXIII line of FIG. 27.

The switching elements 4A, 4B may be composed of semiconductor materials, mainly SiC (silicon carbide), for example. The semiconductor material is not limited to SiC and may be, for example, Si (silicon), GaAs (gallium arsenide) or GaN (gallium nitride), but preferably a wide bandgap semiconductor material may be used. The switching elements 4A, 4B are, for example, MOSFETs. Alternatively, the switching elements 4A, 4B may not be limited to MOSFETs, but may be other transistors. For example, they may be field-effect transistors such as MISFETs (Metal-Insulator-Semiconductor FETs) or bipolar transistors such as IGBTs. Each of the switching elements 4A, 4B is rectangular in plan view, but the present disclosure is not limited to this.

Each switching element 4A, 4B has an element obverse surface 401 and an element reverse surface 402, as shown in FIG. 33. In each switching element 4A, 4B, the element obverse surface 401 and the element reverse surface 402 are spaced apart in the z direction. The element obverse surface 401 faces the z2 direction, and the element reverse surface 402 faces the z1 direction.

Each switching element 4A, 4B is provided with a first electrode 41, a second electrode 42, and a third electrode 43. The first electrode 41 is located on the element reverse surface 402 of the element, as shown in FIG. 33. The second electrode 42 and the third electrode 43 are provided on the element obverse surface 401, as shown in FIGS. 29 and 33. When each switching element 4A, 4B is a MOSFET, the first electrode 41 is a drain electrode, the second electrode 42 is a source electrode, and the third electrode 43 is a gate electrode (drive signal input electrode). When a drive signal (e.g., gate voltage) is input to the third electrode 43 (gate electrode), each switching element 4A, 4B switches between a conduction state and a shutdown state according to this drive signal. This operation is called switching operation. In the conduction state, current flows from the first electrode 41 (drain electrode) to the second electrode 42 (source electrode), but in the shutdown state, no such current flows. The frequency of the drive signal is, for example, 10 kHz or higher. The switching frequency of each switching element 4A, 4B is, for example, 10 kHz or higher.

The switching elements 4A are mounted on the support substrate 5, as shown in FIG. 25, FIGS. 27 to 29 and FIG. 33. In the example shown in FIG. 28, the switching elements 4A are arranged in the y direction, for example, and spaced apart from each other. Each switching element 4A is conductively bonded to the support substrate 5 (conductive substrate 52A described below) through an unillustrated conductive bonding material (for example, a sintered metal such as sintered silver or sintered copper, a metal paste material containing silver or copper, or a solder material). When each switching element 4A is bonded to the conductive substrate 52A, the element reverse surface 402 faces the conductive substrate 52A.

The switching elements 4B are mounted on the support substrate 5, as shown in FIGS. 25, 27 to 29 and 33. In the example shown in FIG. 28, the switching elements 4B are arranged in the y direction, for example, and spaced apart from each other. Each switching element 4B is conductively bonded to the support substrate 5 (conductive substrate 52B described below) through an unillustrated conductive bonding material (for example, a sintered metal such as sintered silver or sintered copper, a metal paste material containing silver or copper, or a solder material). When each switching element 4B is bonded to the conductive substrate 52B, the element reverse surface 402 faces the conductive substrate 52B. In the example shown in FIG. 28, the plurality of switching elements 4A and the plurality of switching elements 4B overlap with each other as viewed in the x direction, though alternatively these switching elements may not overlap with each other as viewed in the predetermined direction.

In the example shown in FIG. 28, semiconductor device B1 includes four switching elements 4A and four switching elements 4B. The number of switching elements 4A and 4B is not limited to this configuration and can be adjusted according to the performance required of the semiconductor device B1. The semiconductor device B1 is, for example, a half-bridge type switching circuit. In this case, the switching elements 4A constitute an upper arm circuit of the semiconductor device B1, and the switching elements 4B constitute a lower arm circuit. The switching elements 4A and the switching elements 4B are connected in series, respectively, and constitute a bridge.

The support substrate 5 supports the switching elements 4A, 4B. The support substrate 5 includes a pair of insulating substrates 51A, 51B and a pair of conductive substrates 52A, 52B.

The insulating substrates 51A, 51B have electrical insulation properties. The constituent material of each insulating substrate 51A, 51B is, for example, a ceramic with excellent thermal conductivity. Such ceramics include, for example, AlN (aluminum nitride) and SiN (silicon nitride). The insulating substrates 51A, 51B are not limited to ceramics and may, for example, be composed of insulating resin sheets. Each insulating substrate 51A, 51B is, for example, rectangular in plan view. The insulating substrates 51A and 51B are spaced apart from each other in the x direction, as shown in FIG. 28. The insulating substrate 51A is located on the x1 direction side of the insulating substrate 51B. As shown in FIG. 33, the top or upper surface (the surface facing the z2 direction) of each insulating substrate 51A, 51B is covered by the sealing member 9, together with the conductive substrates 52A, 52B and the switching elements 4A, 4B. The bottom or lower surface (the surface facing in the z1 direction) of each insulating substrate 51A, 51B is exposed from the sealing member 9 (resin reverse surface 92 described below), as shown in FIGS. 31 and 33, to which a heat sink, not shown, may be connected.

The conductive substrates 52A, 52B are composed of metal plates. The constituent material of these metal plates is, for example, Cu or Cu alloy. The conductive substrates 52A, 52B, together with the two input terminals 71, 72 and the output terminal 73, constitute conductive paths leading to the switching elements 4A, 4B. Each conductive substrate 52A, 52B may be covered with silver plating. The conductive substrates 52A, 52B are spaced apart from each other in the x direction, as shown in FIG. 28. In the example shown in FIG. 28, the conductive substrate 52A is located in the x1 direction side of the conductive substrate 52B.

Referring to FIG. 33, for example, the conductive substrate 52A is bonded to the upper surface of the insulating substrate 51A via a bonding material not shown. The bonding material may be either conductive or insulating. A plurality of switching elements 4A, a signal substrate 6A, and a multilayer capacitor A4 are mounted on the upper surface (facing the z2 direction) of the conductive substrate 52A.

Referring to FIG. 33, for example, the conductive substrate 52B is bonded to the upper surface of the insulating substrate 51B via a bonding material not shown. The bonding material may be either conductive or insulating. A plurality of switching elements 4B and a signal substrate 6B are mounted on the upper surface (facing the z2 direction) of the conductive substrate 52B.

The configuration of the support substrate 5 is not limited to the above example and may be configured as follows. For example, the support substrate 5 may include only one insulating substrate instead of two insulating substrates 51A, 51B, and two conductive substrates 52A, 52B may be bonded to the single insulating substrate. A metal layer may be formed on the lower surface of each insulating substrate 51A, 51B. Further, based on e.g., the number and arrangement of the switching elements 4A and 4B, the shapes, sizes, and arrangement of the insulating substrates 51A, 51B and conductive substrates 52A, 52B may be determined as needed. The support substrate 5 may comprise a DBC (Direct Bonded Copper) substrate or DBA (Direct Bonded Aluminum) substrate.

Figure 34:
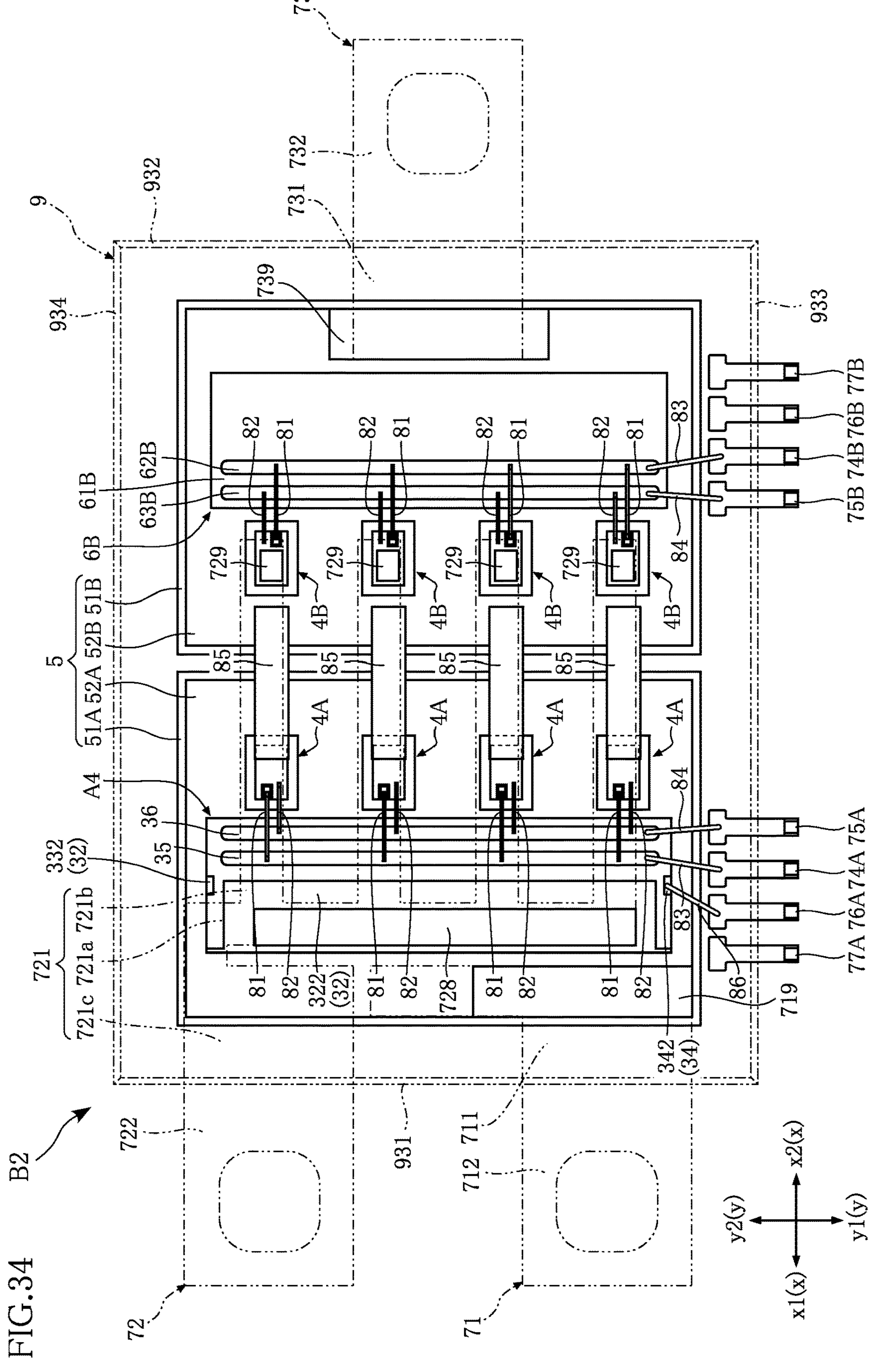
FIG. 34 is a plan view showing a semiconductor device according to a variation of the present disclosure, in which two input terminals, an output terminal and a sealing member are shown with imaginary lines (double-dotted lines).

As seen from FIGS. 28, 29, and 33, the multilayer capacitor A4 is mounted on the conductive substrate 52A. Specifically, within the semiconductor device B1, it is arranged that the obverse surface 101 faces the z2 direction, the reverse surface 102 faces the z1 direction, the side surface 103 faces the x2 direction, and the side surface 104 faces the x1 direction. The reverse surface covering portion 313 of the external electrode 31 of the multilayer capacitor A4 is bonded to the conductive substrate 52A by a conductive bonding material (e.g., solder), which is not shown in the figure. As a result, the external electrode 31 and the conductive substrate 52A are electrically connected to each other. A portion of the input terminal 72 is bonded to the obverse surface covering portion 322 of the external electrode 32 of the multilayer capacitor A4 via a block member 728 described below. As a result, the external electrode 32 and the input terminal 72 are electrically connected to each other. When the multilayer capacitor A4 is mounted on the conductive substrate 52A, an insulating film 39 is interposed between the external electrode 32 and the conductive substrate 52A, as shown in FIG. 34. The insulating film 39 ensures insulation between the external electrode 32 and the conductive substrate 52A. As such, the external electrodes 31, 32 and the insulating film 39 of the multilayer capacitor A4 are a preferred configuration for applying the capacitor to the semiconductor device B1.

The wiring layer 35 of the multilayer capacitor A4 is electrically connected to the third electrodes 43 (gate electrodes) of the respective switching elements 4A through the connecting members 81, as shown in FIGS. 28 and 29. A drive signal that controls the switching operation of the switching elements 4A is input to the wiring layer 35. The wiring layer 35 is used as the gate wiring of the upper arm (switching elements 4A). In this case, the parasitic capacitance between the wiring layer 35 and the first conductor 21 of the laminate section 20A should preferably be sufficiently small. For example, the parasitic capacitance may be set to less than half of the feedback capacitance Crss of the upper arm (switching elements 4A), and preferably to less than 1/10 of it. The wiring layer 36 of the multilayer capacitor A4 is electrically connected to the second electrodes 42 (source electrodes) of the respective switching elements 4A via the connecting members 82, as shown in FIGS. 29 and 30. The source current of the switching elements 4A flows through the wiring layer 36.

The signal substrate 6B is mounted on the conductive substrate 52B. The signal substrate 6B includes a base member or substrate 61B and two wiring layers 62B, 63B.

The base member 61B is made of an insulating material. The base member 61B is, for example, rectangular in plan view. Two wiring layers 62B, 63B are formed on the base member 61B. The two wiring layers 62B, 63B are located on opposite sides of the conductive substrate 52B with the base member 61B intervening in the z direction. Each of the wiring layers 62B, 63B may have an elongated band shape extending in the y direction in plan view as shown, for example, in FIG. 28. The two wiring layers 62B, 63B are arranged in parallel to each other and spaced apart in the x direction. The wiring layer 62B is electrically connected to the third electrodes 43 (gate electrodes) of the respective switching elements 4B via the connecting members 81. A drive signal for controlling the switching operation of the switching elements 4B is input to the wiring layer 62B. The wiring layer 63B is electrically connected to the second electrodes 42 (source electrodes) of the respective switching elements 4B via the connecting members 82. The source current of the switching elements 4B flows through the wiring layer 63B.

The input terminals 71, 72 comprise metal plates. The material for forming the metal plates may be Cu or Cu alloy. The input terminals 71, 72 are located on a x1 direction side of the semiconductor device B1, for example, as shown in FIGS. 24 to 28. A voltage from e.g., a power supply is applied between the input terminals 71, 72. The input terminal 71 is the positive pole (P terminal) and the input terminal 72 is the negative pole (N terminal). The input terminals 71 and 72 are spaced apart from each other.

The input terminal 71 includes a pad portion 711 and a terminal portion 712, as shown, for example, in FIGS. 27, 28, and 33.

The pad portion 711 is the portion of the input terminal 71 that is covered by the sealing member 9. The pad portion 711 is conductively bonded to the conductive substrate 52A via a conductive block member 719, as shown, for example, in FIGS. 27, 28 and 33. The pad portion 711 is joined to the block member 719 via a conductive bonding material not shown, and the block member 719 is joined to the conductive substrate 52A via a conductive bonding material not shown. As a result, the input terminal 71 and the conductive substrate 52A are electrically connected to each other. The block member 719 may be made of, without limitation, a composite material containing Cu, Cu alloy, or CuMo (copper-molybdenum), or a composite material containing CIC (Copper-Inver-Copper), for example. The bonding between the pad portion 711 and the block member 719, and the bonding between the block member 719 and the conductive substrate 52A are not limited to the bonding using a conductive bonding material, but may be implemented by laser welding or ultrasonic bonding, for example. The bonding between the pad portion 711 and the conductive substrate 52A is not limited to the above configuration using the block member 719. For instance, the pad portion 711 may be bonded directly to the conductive substrate 52A by partially bending the pad portion 711.

The terminal portion 712 is the portion of the input terminal 71 that is exposed out from the sealing member 9. The terminal portion 712 extends from the sealing member 9 in the x1 direction in plan view, as shown, for example, in FIGS. 27 and 33. The terminal portion 712 is, for example, rectangular in plan view.

The input terminal 72 includes a pad portion 721 and a terminal portion 722, as shown, for example, in FIGS. 27 and 28.

The pad portion 721 is the portion of the input terminal 72 that is covered by the sealing member 9. The pad portion 721 includes a joining portion or part 721*a*, a plurality of extensions 721*b*, and a connecting portion or part 721*c*, as shown in FIGS. 27 and 28.

The joining portion 721*a* has an elongated band shape extending in the y direction, for example, as shown in FIG. 27. The joining portion 721*a* is joined to the outer electrode 32 (obverse surface covering portion 322) of the multilayer capacitor A4 via a conductive block member 728 as shown in FIGS. 27, 28 and 33. The joining portion 721*a* is joined to the block member 728 via a conductive bonding material not shown, and the block member 728 is joined to the obverse surface covering portion 322 via a conductive bonding material not shown. This provides conductivity between the input terminal 72 and the external electrode 32. The material for forming the block member 728 is not particularly limited, but is, for example, Cu, a Cu alloy, a CuMo composite, or a CIC composite material. The bonding between the joining portion 721*a* and the block member 728, and the bonding between the block member 728 and the obverse surface covering portion 322 are not limited to the joining using a conductive bonding material, but may be implemented by laser welding or ultrasonic joining, for example.

Each extension 721*b* has an elongated band shape extending from the joining portion 721*a* in the x2 direction, as shown in FIGS. 27 and 28. The extensions 721*b* extend from the joining portion 721*a* in the x direction until they overlap with the switching elements 4B, respectively, in plan view. The plurality of extensions 721*b* are spaced apart from each other in the y direction, and arranged parallel to each other in plan view. Each extension 721*b* has an tip or end part joined to a corresponding switching element 4B via a conductive block member 729, as shown for example in FIGS. 27, 28 and 33. As shown in FIG. 33, the tip of each extension 721*b* is bonded to the switching element 4B via an unillustrated conductive block member 729, and the block member 729 is bonded to the second electrode 42 (source electrode) of the switching element 4B via a conductive bonding material not shown. Thus, the input terminal 72 and the second electrode 42 of the switching elements 4B are electrically connected. The block member 729 may be made of, for example, Cu, a Cu alloy, a CuMo composite material, or a CIC composite material, although the material used for making the block member 729 is not particularly limited. The extension 721*b* and block member 729, and block member 729 and second electrode 42, respectively, are not limited to bonding using conductive bonding materials, but may be bonded by laser welding or ultrasonic bonding, for example. The bonding between the extensions 721*b* and the second electrodes 42 of the respective switching elements 4B is not limited to the above-noted configuration using the block member 729. Alternatively, each extension 721*b* may be directly bonded to the second electrode 42 of the corresponding switching element 4B by partially bending the extension 721*b*.

The connecting portion 721*c* is the portion that connects the joining portion 721*a* to the terminal portion 722, as shown in FIGS. 27 and 28.

The terminal portion 722 is the portion of the input terminal 72 that is exposed out from the sealing member 9. The terminal portion 722 extends from the sealing member 9 in the x1 direction in plan view, as shown in FIGS. 27 and 28, for example. The terminal portion 722 is located on the y2 direction side of the terminal portion 712 of the input terminal 71 in plan view, as shown in FIGS. 27 and 28. The plan-view shape of the terminal portion 722 is, for example, the same as the plan view shape of the terminal portion 712.

The output terminal 73 is formed by a metal plate. The material for forming the metal plate is, for example, Cu or a Cu alloy. The output terminal 73 is located on the x2 direction side of the semiconductor device B1, for example, as shown in FIGS. 25 to 28. The AC power (voltage) converted by the switching elements 4A, 4B is output through the output terminal 73.

The output terminal 73 includes a pad portion 731 and a terminal portion 732, as shown in FIGS. 27, 28, and 33.

The pad portion 731 is the portion of the output terminal 73 that is covered by the sealing member 9. The pad portion 731 is conductively bonded to the conductive substrate 52B via a conductive block member 739, as shown in FIGS. 27, 28, and 33. As shown in FIG. 33, the pad portion 731 is conductively bonded to the block member 739 via a conductive bonding material not shown. The block member 739 is bonded to the conductive substrate 52B via a conductive bonding material not shown. As a result, the output terminal 73 and the conductive substrate 52B are electrically connected to each other. The block member 739 is made of, without limitation, Cu, a Cu alloy, a CuMo composite material, or a CIC composite material, for example. The bonding between the pad portion 731 and the block member 739, and the bonding between the block member 739 and the conductive substrate 52B are not limited to the above bonding using a conductive bonding materials, but may be implemented, for example, by laser welding or ultrasonic bonding. The bonding between the pad portion 731 and the conductive substrate 52B is not limited to the above bonding using the block member 739. Alternatively, the pad portion 731 may be directly bonded to the conductive substrate 52B by partially bending the pad portion 731.

The terminal portion 732 is the portion of the output terminal 73 that is exposed from the sealing member 9. The terminal portion 732 extends out from the sealing member 9 in the x2 direction, for example, as shown in FIGS. 27 and 28. The terminal portion 732 is rectangular in plan view, for example.

The signal terminals 74A-77A, 74B-77B are provided to input or output control signals for the semiconductor device B1. The control signals include, for example, drive signals for controlling the switching operation of the switching elements 4A and 4B. The signal terminals 74A-77A and 74B-77B are of substantially the same shape as each other. The signal terminals 74A-77A, 74B-77B are arranged along the x direction as shown in FIG. 24 to FIG. 31. The signal terminals 74A-77A, 74B-77B each have an L-shape and overlap with each other as viewed in the x direction, as seen from FIG. 32. As shown in FIGS. 27 to 29, the signal terminals 74A-77A are located next to the conductive substrate 52A in plan view, and the signal terminals 74B-77B are located next to the conductive substrate 52B in plan view. Each signal terminal 74A-77A and 74B-77B protrudes from the y1-direction-facing surface (resin side surface 933 described below) of the sealing member 9, as shown in FIGS. 27 and 28. The signal terminals 74A-77A and 74B-77B may be formed from a single lead frame.

The signal terminal 74A is electrically connected to the wiring layer 35 through the connecting member 83, for example, as shown in FIG. 28. As described above, the wiring layer 35 is electrically connected to the third electrode 43 (gate electrode) of each switching element 4A, so the signal terminal 74A is electrically connected to the third electrode 43 of each switching element 4A. The signal terminal 74A is a terminal for input of driving signals (gate signal input terminal) for the switching elements 4A, and drive signals (gate voltage) for driving the switching elements 4A are input to the signal terminal 74A.

The signal terminal 74B is electrically connected to the wiring layer 62B through the connecting member 83, for example, as shown in FIG. 28. As described above, the wiring layer 62B is electrically connected to the third electrode 43 (gate electrode) of each switching element 4B, so the signal terminal 74B is electrically connected to the third electrode 43 of each switching element 4B. The signal terminal 74B is a terminal for input of driving signals (gate signal input terminal) for the switching elements 4B, and drive signals (gate voltage) for driving the switching elements 4B are input to the signal terminal 74B.

Each signal terminal 74A, 74B include a portion covered by the sealing member 9 and the remaining portion exposed from the sealing member 9, as shown, for example, in FIGS. 27 to 29. In each signal terminal 74A, 74B, the portion covered by the sealing member 9 is connected to a connecting member 83. The exposed portion of each signal terminal 74A, 74B from the sealing member 9 is bent as required.

The signal terminal 75A is electrically connected to the wiring layer 36 through the connecting member 84, for example, as shown in FIG. 28. As described above, the wiring layer 36 is electrically connected to the second electrode 42 (source electrode) of each switching element 4A, and thus the signal terminal 75A is electrically connected to the second electrode 42 of each switching element 4A. The signal terminal 75A is the source signal detection terminal for each switching element 4A. The voltage applied to the second electrode 42 of each switching element 4A (voltage corresponding to the source current) can be detected from the signal terminal 75A.

The signal terminal 75B is electrically connected to the wiring layer 63B through the connecting member 84, for example, as shown in FIG. 28. As described above, the wiring layer 63B is electrically connected to the second electrode 42 (source electrode) of each switching element 4B, and thus the signal terminal 75B is electrically connected to the second electrode 42 of each switching element 4B. The signal terminal 75B is the source signal detection terminal for each switching element 4B. The voltage applied to the second electrode 42 of each switching element 4B (voltage corresponding to the source current) can be detected from the signal terminal 75B.

Each signal terminal 75A, 75B includes a portion covered by the sealing member 9 and the remaining portion exposed from the sealing member 9, as shown, for example, in FIGS. 27 to 29. The covered portion of each signal terminal 75A, 75B with the sealing member 9 is connected to a connecting member 84. The exposed portion of each signal terminal 75A, 75B from the sealing member 9 is bent as required.

The signal terminals 76A, 76B, 77A, 77B are isolated so as not to be electrically connected to the other components as shown in FIGS. 27 through 29. The semiconductor device B1 may be configured without these signal terminals 76A, 76B, 77A, 77B.

Each signal terminal 76A, 76B, 77A, 77B includes a portion covered by the sealing member 9 and the remaining portion exposed from the sealing member 9, as shown in FIGS. 27 to 29, for example. No element is bonded to the inner portion of each signal terminal 76A, 76B, 77A, 77B covered by the sealing member 9. The exposed portion of each signal terminal 76A, 76B, 77A, 77B from the sealing member 9 is bent in the illustrated example, though the exposed portion may be unbent.

Each connecting member 81 to 85 electrically connects two portions or parts, etc., spaced apart from each other. The connecting members 81 to 84 are, for example, bonding wires and may be made of A1 (aluminum), Au (gold), or Cu.

The connecting member 85 is a metal plate, for example, made of Cu, a Cu alloy, a CuMo composite, or a CIC composite.

As shown in FIG. 28, each connecting member 81 is bonded at one end to the third electrode 43 (gate electrode) of the switching element 4A, 4B, and also bonded at the other end to the wiring layer 35 (multilayer capacitor A4) or the wiring layer 62B (signal substrate 6B). More specifically, the plurality of connecting members 81 include a member for electrically connecting the third electrode 43 of a switching element 4A to the wiring layer 35 and another member for electrically connecting the third electrode 43 of a switching element 4B to the wiring layer 62B.

As shown in FIG. 28, each connecting member 82 has one end bonded to the second electrode 42 (source electrode) of a switching element 4A, 4B and the other end bonded to the wiring layer 36 (multilayer capacitor A4) or wiring layer 63B (signal substrate 6B). In the illustrated example, the plurality of connecting members 82 include one that electrically connects the second electrode 42 of a switching element 4A to the wiring layer 36 and one that electrically connects the second electrode 42 of a switching element 4B to the wiring layer 63B.

One of the two connecting members 83 electrically connects the wiring layer 35 of the multilayer capacitor A4 to the signal terminal 74A (gate signal input terminal), as shown in FIG. 28. One end of this connecting member 83 is bonded to the wiring layer 35 and the other end is bonded to the signal terminal 74A. The other of the connecting members 83 electrically connects the wiring layer 62B of the signal substrate 6B to the signal terminal 74B (gate signal input terminal), as shown in FIG. 28. One end of the connecting member 83 is bonded to the wiring layer and the other end is bonded to the signal terminal 74B.

One of the two connecting members 84 electrically connects the wiring layer 36 of the multilayer capacitor A4 to the signal terminal 75A (source signal detection terminal), as shown in FIG. 28. One end of this connecting member 84 is bonded to the wiring layer 36 and the other end is bonded to the signal terminal 75A. The other of the connecting members 84 electrically connects the wiring layer 63B of the signal substrate 6B to the signal terminal 75B (source signal detection terminal), as shown in FIG. 28. One end of this connecting member 84 is bonded to the wiring layer 63B and the other end is bonded to the signal terminal 75B.

Each connecting member 85 electrically connects the second electrode 42 (source electrode) of a switching element 4A to the conductive substrate 52B, as shown in FIGS. 28, 29 and 33. Each connecting member 85 has an elongated strip shape in plan view and extending in the x direction, as shown in FIGS. 28 and 29. As shown in FIG. 33, each connecting member 85 is bonded to the second electrode 42 (source electrode) of the switching element 4A at the end of the x1 direction side via a conductive bonding material not shown. The end of each connecting member 85 of the x2 direction side is bonded to the conductive substrate 52B via a conductive bonding material not shown. The bonding of each connecting member 85 to the conductive substrate 52B is not limited to the method using conductive bonding material, but may be other methods such as laser welding or ultrasonic welding, for example. In the example shown in FIG. 33, it is possible for each connecting member 85 to be joined to the second electrode 42 of the switching element 4A and the conductive substrate 52B with a height difference present between them in the z direction, since the connecting member 85 includes a partial thicker portion. Unlike the example shown in FIG. 33, each connecting member 85 may be bent at a suitable location so as to be properly jointed to the second electrode 42 of the switching element 4A and the conductive substrate 52B between which a height difference is present in the z direction.

As shown in FIGS. 27, 28, and 33, the sealing member 9 covers the switching elements 4A, 4B, the support substrate 5 (except the lower surfaces of the insulating substrates 51A, 51B), the multilayer capacitor A4, the signal substrate 6B, a part of each input terminal 71, 72, a part of the output terminal 73, each signal terminal 74A-77A, 74B-77B, and a part of each signal terminal 74A-77A, 74B-77B, and the connection members 81-85. The material for forming the sealing member 9 is, for example, an epoxy resin. The sealing member 9 has a resin obverse surface 91, a resin reverse surface 92, and resin side surfaces 931-934, as shown in FIGS. 26 to 33.

The resin obverse surface 91 and the resin reverse surface 92 are spaced apart in the z direction, as shown in FIGS. 30, 32 and 33. The resin obverse surface 91 faces in the z2 direction and the resin reverse surface 92 faces in the z1 direction. The resin reverse surface 92 is, in plan view, a frame surrounding the lower surfaces of the insulating substrates 51A and 51B, as shown in FIG. 31. As shown in FIG. 33, the lower surfaces of the insulating substrates 51A, 51B are exposed from the resin reverse surface 92. The resin side surfaces 931-934 are connected to the resin obverse surface 91 and the resin reverse surface 92 and are disposed between them in the z direction, as shown in FIGS. 30 and 32. As shown in FIGS. 26 through 28 and FIG. 31, the resin side surface 931 and the resin side surface 932 are spaced apart in the x direction. The resin side surface 931 faces in the x1 direction and the resin side surface 932 faces in the x2 direction. The two input terminals 71, 72 project out from the resin side 931, and the output terminal 73 projects from the resin side 932. As shown in FIGS. 26 through 28 and FIG. 31, the resin side 933 and the resin side 934 are spaced apart in the y direction. The resin side surface 933 faces the y1 direction and the resin side surface 934 faces the y2 direction. The signal terminals 74A-77A and 74B-77B protrude our from the resin side surface 934.

The advantages of the semiconductor device B1 of the present disclosure are as follows.

The semiconductor device B1 is provided with switching elements 4A, switching elements 4B, and multilayer capacitor A4. The switching elements 4A and the switching elements 4B are connected in series to form bridges. The external electrodes 31 and 32 of the multilayer capacitor A4 are electrically connected to both ends of each bridge. As described above, the multilayer capacitor A4 has a capacitance between the external electrode 31 and the external electrode 32, and functions as a snubber capacitor connected to both ends of the above-noted bridges. According to this configuration, a current path through the multilayer capacitor A4 and the switching elements 4A, 4B is formed. Thus, the semiconductor device B1 can suppress the surge voltage applied to the switching elements 4A, 4B because the internal inductance can be reduced compared to the case without the multilayer capacitor A4.

In the semiconductor device B1, the wiring layer 35 of the multilayer capacitor A4 relays drive signals between the switching elements 4A and the signal terminal 74A. The wiring layer 36 of the multilayer capacitor A4 relays source signals between the switching elements 4A and the signal terminal 75A. According to this configuration, the multilayer capacitor A4 functions as a wiring substrate. Thus, in the semiconductor device B1, the multilayer capacitor A4 functions as a snubber capacitor and also functions as a wiring substrate. Advantageously, this contributes to the downsizing of the semiconductor device B1 since there is no need to mount a snubber capacitor and a wiring substrate separately.

In the semiconductor device B1, the multilayer capacitor A4 is bonded to the conductive substrate 52A together with the switching elements 4A. According to this configuration, when the semiconductor device B1 is energized, the heat generated by the multilayer capacitor A4 and the switching elements 4A is diffused in the conductive substrate 52A and then released to the outside through the conductive substrate 52A and further the insulating substrate 51A. Thus, the heat dissipation path for the multilayer capacitor A4 is the same as that for the switching elements 4A. In this manner, the semiconductor device B1 can improve the heat dissipation of the multilayer capacitor A4.

FIG. 34 shows a semiconductor device B2 according to a variation of the present disclosure. Compared to the semiconductor device B1, the semiconductor device B2 is further provided with a connecting member 86 that connects the external electrode 34 of the multilayer capacitor A4 to the signal terminal 76A. FIG. 34 is a plan view of the semiconductor device B2, corresponding to FIG. 28.

The connecting member 86 may be a bonding wire like the connecting members 81-84. As shown in FIG. 34, one end of the connecting member 86 is bonded to the obverse surface covering portion 342 of the external electrode 34, and the other end is bonded to the portion of the signal terminal 76A covered by the sealing member 9. Thus, the external electrode 34 and the signal terminal 76A are electrically connected to each other.

As with the semiconductor device B1, the semiconductor device B2 is provided with switching elements 4A, switching elements 4B, and multilayer capacitor A4. Thus, like the semiconductor device B1, the semiconductor device B2 can reduce the internal inductance, and thereby suppressing the surge voltage applied to the switching elements 4A, 4B.

The semiconductor device B2 has the connecting member 86 connecting the external electrode 34 to the signal terminal 76A. According to this configuration, the signal terminal 76A functions as a terminal electrically connected to the third conductors 23. Thus, the signal terminal 76A can be used to detect the potential of the third conductors 23. From a different perspective, it is also possible to control the potential of the third conductors 23. For instance, by connecting the signal terminal 76A to ground (GND), the potential of the third conductors 23 can be set to a reference potential. In this case, the multilayer capacitor A4 can function as a Y capacitor. Accordingly, the semiconductor device B2 can reduce common node noise.

Figure 35:
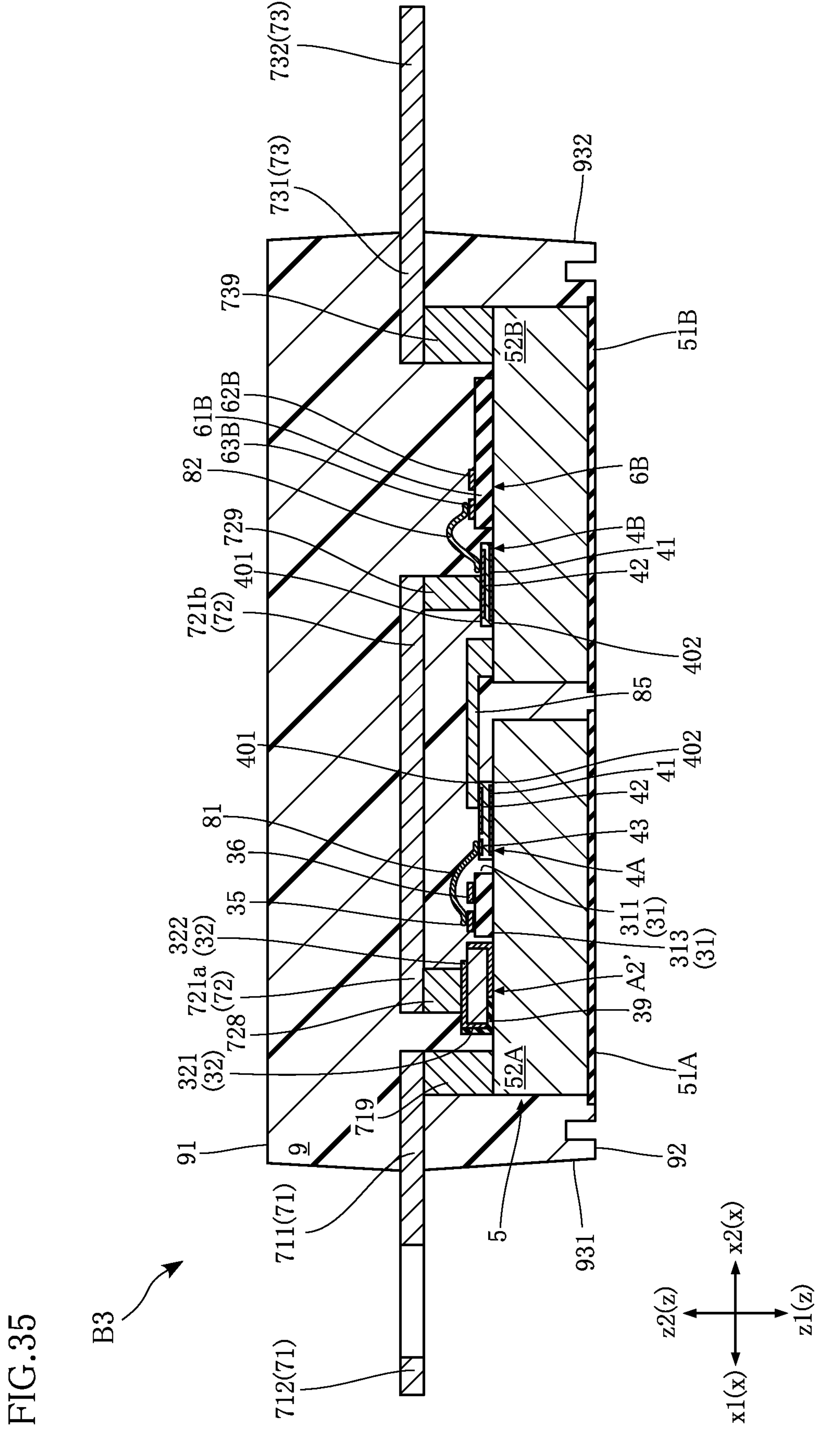
FIG. 35 is a cross-sectional view showing a semiconductor device according to another variation of the present disclosure.

FIG. 35 shows a semiconductor device B3 according to another variation of the present disclosure. The semiconductor device B3 differs from the semiconductor device B2 in that it has a multilayer capacitor A2' instead of a multilayer capacitor A4 and furthermore has a signal substrate 6A. FIG. 35 shows a cross-sectional view of the semiconductor device B3, corresponding to the cross-sectional view of FIG. 33.

The multilayer capacitor A2' is obtained by applying the configuration of the external electrodes 31, 32 of the multilayer capacitor A4 to the multilayer capacitor A2, and further providing it with an insulating film 39.

The signal substrate 6A is mounted on the conductive substrate 52A. The signal substrate 6A has the same structure as the signal substrate 6B and includes a base member 61A and two wiring layers 62A, 63A.

The base member 61A is made of an insulating material, with two wiring layers 62A and 63A formed on the base member 61B. The wiring layer 62A is electrically connected to the third electrodes 43 (gate electrodes) of the switching elements 4A via connecting members 81. A drive signal for controlling the switching operation of the switching elements 4A is input to the wiring layer 62A. The wiring layer 63A is electrically connected to the second electrodes 42 (source electrodes) of the switching elements 4A via connecting members 82. The source current of the switching elements 4A flows through the wiring layer 63A.

Like the semiconductor device B1, the semiconductor device B3 has the external electrodes 31 and 32 of the multilayer capacitor A2' electrically connected to the ends of the bridges provided by the switching elements 4A and 4B. Thus, as with the semiconductor device B1, the semiconductor device B3 can reduce the internal inductance, thereby suppressing the surge voltage applied to the switching elements 4A and 4B.

Figure 36:
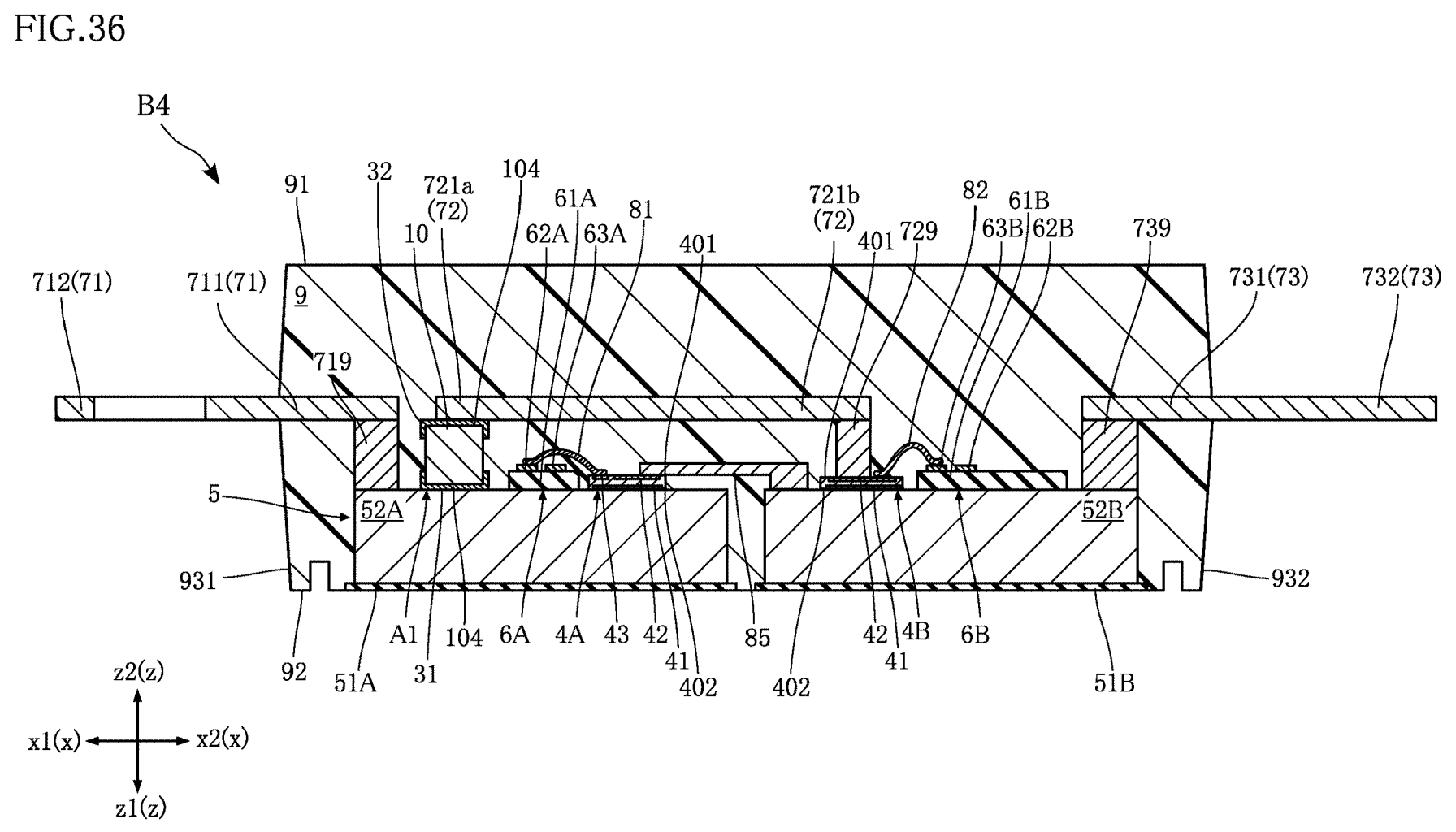

FIG. 36 shows a semiconductor device B4 according to another variation of the present disclosure. The semiconductor device B4 differs from the semiconductor device B1 in that it has a multilayer capacitor A1 instead of a multilayer capacitor A4 and also has a signal substrate 6A. FIG. 36 shows a cross-sectional view of the semiconductor device B4, corresponding to the cross-sectional view of FIG. 33.

In the semiconductor device B4, the multilayer capacitor A1 is mounted on the conductive substrate 52A with the side surface 103 facing the z1 direction and the side surface 104 facing the z2 direction. As shown in FIG. 36, the external electrode 31 (side surface covering portion 311) is electrically connected to the conductive substrate 52A, and the pad portion 721 (joining portion 721*a*) is electrically connected to the external electrode 32 (side surface covering portion 321). As such, in the semiconductor device B4, the pad portion 721 (joining portion 721*a*) is joined to the multilayer capacitor A1 without using a block member 728.

Like the semiconductor device B1, the semiconductor device B4 has the external electrodes 31 and 32 of the multilayer capacitor A1 electrically connected to the ends of the bridges provided by the switching elements 4A and 4B. Thus, like the semiconductor device B1, the semiconductor device B4 can reduce the internal inductance, thereby suppressing the surge voltage applied to the switching elements 4A, 4B.

The semiconductor device B4 described above is provided with a multilayer capacitor A1. Alternatively, it may be provided with a multilayer capacitor A2 or a multilayer capacitor A3 instead of the multilayer capacitor A1.

The multilayer capacitors and semiconductor devices according to the present disclosure are not limited to the embodiments described above. The specific configuration of each part of each multilayer capacitor and each semiconductor device of the present disclosure may be modified in various ways. The present disclosure includes the embodiments described in the following Clauses.

Clause 1.

A multilayer capacitor comprising:

a stacked body including a first side surface and a second side surface that are spaced apart from each other in a first direction;

a first external electrode including a first side surface covering portion covering the first side surface; and a second external electrode including a second side surface covering portion covering the second side surface;

wherein the stacked body includes a plurality of laminate sections and a plurality of insulating layers that are arranged alternately in a second direction perpendicular to the first direction, each of the laminate sections includes a first conductor, a second conductor, a third conductor, and a dielectric member, in each laminate section, the first conductor is connected to the first side surface covering portion and spaced apart from the second external electrode, the second conductor is connected to the second side surface covering portion and spaced apart from the first external electrode, and the third conductor includes a first part and a second part each of which is spaced apart from the first conductor and the second conductor and also spaced apart from the first external electrode and the second external electrode, wherein the first part and the first conductor sandwich the dielectric member in the second direction, and the second part and the second conductor sandwich the dielectric member in the second direction, the dielectric member having a first surface and a second surface spaced apart from each other in the second direction, at least the first conductor being in contact with the first surface, at least the first part being in contact with the the second surface, each of the insulating layers has a lower dielectric withstanding voltage than the dielectric member of each laminate section, the plurality of laminate sections includes two laminate sections adjacent in the second direction, and the first surfaces or the second surfaces of the respective two laminate sections are arranged to face each other in the second direction.

Clause 2.

The multilayer capacitor according to clause 1, wherein in each laminate section, the third conductor includes a connecting part that connects the first part and the second part to each other, and the second conductor is in contact with the first surface, and the second part and the connecting part are in contact with the second surface.

Clause 3.

The multilayer capacitor according to clause 2, wherein in each laminate section, an insulating member made of a same material as the insulating layers is disposed between the first conductor and the second conductor, between the third conductor and the first side surface covering portion, and between the third conductor and the second side surface covering portion.

Clause 4.

The multilayer capacitor according to clause 1, wherein in each laminate section, the first part and the second part are spaced apart from each other and sandwich the dielectric member in the second direction, the second part being in contact with the first surface, the second conductor being in in contact with the second surface.

Clause 5.

The multilayer capacitor according to clause 4, wherein in each laminate section, an insulating member made of a same material as the insulating layers is disposed between the first conductor and the second part, between the second conductor and the first part, between the first part and the first side surface covering portion, and between the second conductor and the first part, and between the second part and the second side surface covering portion.

Clause 6.

The multilayer capacitor according to any one of clauses 1-5, wherein the stacked body includes a third side surface and a fourth side surface that are spaced apart from each other in a third direction perpendicular to the first direction and the second direction, and in each laminate section, the first conductor and the second conductor are spaced apart from the third side surface and the fourth side surface.

Clause 7.

The multilayer capacitor according to clause 6, wherein in each laminate section, the first part of the third conductor is exposed from the third side surface, and the second part of the third conductor is exposed from the fourth side surface.

Clause 8.

The multilayer capacitor according to clause 7, further comprising a third external electrode spaced apart from the first external electrode and the second external electrode, wherein the third external electrode covers a part of the third side surface and is connected to the first part in each laminate section.

Clause 9.

The multilayer capacitor according to clause 8, further comprising a fourth external electrode spaced apart from the first external electrode, the second external electrode and the third external electrode, wherein the fourth external electrode covers a part of the fourth side surface and is connected to the second part in each laminate section.

Clause 10.

The multilayer capacitor according to any one of clauses 6-9, wherein in each laminate section, the dielectric member extends continuously from the third side surface and to the fourth side surface in the third direction.

Clause 11.

The multilayer capacitor according to any one of clauses 1-10, wherein in each laminate section, the dielectric member is in contact with the first side surface covering portion and the second side surface covering portion.

Clause 12.

A semiconductor device comprising:

a multilayer capacitor in accordance with any one of clauses 1-11;

a first switching element having a first element obverse surface and a first element reverse surface that are spaced apart from each other in the second direction;

a second switching element having a second element obverse surface and a second element reverse surface that are spaced apart from each other in the second direction; and a first conductive member and a second conductive member that are spaced apart from each other;

wherein the first switching element and the second switching element are connected in series and form a bridge, the first external electrode and the second external electrode are electrically connected to a first end and a second end of the bridge, respectively, the multilayer capacitor and the first switching element are mounted on the first conductive member, the second switching element is mounted on the second conductive member.

Clause 13.

The semiconductor device according to clause 12, wherein the stacked body includes a stacked body obverse surface and a stacked body reverse surface that are spaced apart in the second direction and each connected to the first side surface and the second side surface, the second external electrode includes an obverse surface covering portion that is formed on the stacked body obverse surface and connected to the second side surface covering portion, the first external electrode includes a reverse surface covering portion that is formed on the stacked body reverse surface and connected to the first side surface covering portion.

Clause 14.

The semiconductor device according to clause 13, wherein the first switching element includes a drive signal input electrode that is formed on the first element obverse surface and receives a drive signal, the multilayer capacitor includes a wiring layer that is formed on the stacked body obverse surface and spaced apart from the first side surface covering portion and the obverse surface covering portion, the wiring layer receives a drive signal for the first switching element.

Clause 15.

The semiconductor device according to clause 13 or 14, wherein the multilayer capacitor is formed with an insulating film that insulates the second side surface covering portion and the first conductive member from each other.

Clause 16.

The semiconductor device according to any one of clauses 12-15, wherein the first switching element includes a first obverse surface electrode formed on the first element obverse surface and a first reverse surface electrode formed on the first element reverse surface, the second switching element includes a second obverse surface electrode formed on the second element obverse surface and a second reverse surface electrode formed on the second element reverse surface, the first reverse surface electrode is bonded to the first conductive member, the second reverse surface electrode is bonded to the second conductive member, the first external electrode is bonded to the first conductive member, the first obverse surface electrode and the second conductive member are electrically connected to each other; and the second obverse surface electrode and the second external electrode are electrically connected to each other.

Clause 17.

The semiconductor device according to clause 16, further comprising:

a first input terminal electrically connected to the first reverse surface electrode via the first conductive member;

a second input terminal electrically connected to the second obverse surface electrode and the first external electrode;

an output terminal electrically connected to the second reverse surface electrode via the second conductive member; and a connecting member electrically connecting the first obverse surface electrode and the second conductive member to each other.

Clause 18.

The semiconductor device according to any one of clauses 13-17, further comprising:

an additional first switching element mounted on the first conductive member and connected in parallel to the above-mentioned first switching element; and an additional second switching element mounted on the second conductive member and connected in parallel to the above-mentioned second switching element.

LIST OF REFERENCES

A1-A4, A2': Multilayer capacitor
10: Stacked body
101: Obverse surface
102: Reverse surface
103-106: Side surface
20, 20A-20D: Laminate section
21: First conductor
22: Second conductor
23: Third conductor
230: Connecting part
231: First part
232: Second part
24: Dielectric layer
241: First surface
242: Second surface
25: Insulator
29, 29A-29E: Insulating layer
31-34: External electrode
311, 321, 331, 341: Side surface covering portion
312, 322, 332, 342: Obverse surface covering portion
313, 323: Reverse surface covering portion
35, 36: Wiring layer
39: Insulating film
B1-B4: Semiconductor device
4A, 4B: Switching element
401: Element obverse surface
402: Element reverse surface
41: First electrode
42: Second electrode
43: Third electrode
5: Support substrate
51A, 51B: Insulating substrate
52A, 52B: Conductive substrate
6A, 6B: Signal substrate
61A, 61B: Base member
62A, 62B: Wiring layer
63A, 63B: Wiring layer
71: Input terminal
711: Pad portion
712: Terminal portion
719: Block member
72: Input terminal
721: Pad portion
721a: Joining portion
721b: Extension
721c: Connecting portion
722: Terminal portion
728: Block member
729: Block member
73: Output terminal
731: Pad portion
732: Terminal portion
739: Block member
74A, 74B: Signal terminal
75A, 75B: Signal terminal
76A, 76B, 77A, 77B: Signal terminal
81-86: Connecting member
9: Sealing member
91: Resin obverse surface
92: Resin reverse surface
931-934: Resin side surface

The invention claimed is:

1. A multilayer capacitor comprising:

a stacked body including a first side surface and a second side surface that are spaced apart from each other in a first direction;

a first external electrode including a first side surface covering portion covering the first side surface; and a second external electrode including a second side surface covering portion covering the second side surface;

wherein the stacked body includes a plurality of laminate sections and a plurality of insulating layers that are arranged alternately in a second direction perpendicular to the first direction, each of the laminate sections includes a first conductor, a second conductor, a third conductor, and a dielectric member, in each laminate section, the first conductor is connected to the first side surface covering portion and spaced apart from the second external electrode, the second conductor is connected to the second side surface covering portion and spaced apart from the first external electrode, and the third conductor includes a first part and a second part each of which is spaced apart from the first conductor and the second conductor and also spaced apart from the first external electrode and the second external electrode, wherein the first part and the first conductor sandwich the dielectric member in the second direction, and the second part and the second conductor sandwich the dielectric member in the second direction, the dielectric member having a first surface and a second surface spaced apart from each other in the second direction, at least the first conductor being in contact with the first surface, at least the first part being in contact with the second surface, each of the insulating layers has a lower dielectric withstanding voltage than the dielectric member of each laminate section, the insulating layers being made of a material different from a material of the dielectric member, the plurality of laminate sections includes two laminate sections adjacent in the second direction, and the first surfaces or the second surfaces of the respective two laminate sections are arranged to face each other in the second direction.

2. The multilayer capacitor according to claim 1, wherein in each laminate section, the third conductor includes a connecting part that connects the first part and the second part to each other, and the second conductor is in contact with the first surface, and the second part and the connecting part are in contact with the second surface.

3. The multilayer capacitor according to claim 2, wherein in each laminate section, an insulating member made of a same material as the insulating layers is disposed between the first conductor and the second conductor, between the third conductor and the first side surface covering portion, and between the third conductor and the second side surface covering portion.

4. The multilayer capacitor according to claim 1, wherein in each laminate section, the first part and the second part are spaced apart from each other and sandwich the dielectric member in the second direction, the second part being in contact with the first surface, the second conductor being in in contact with the second surface.

5. The multilayer capacitor according to claim 4, wherein in each laminate section, an insulating member made of a same material as the insulating layers is disposed between the first conductor and the second part, between the second conductor and the first part, between the first part and the first side surface covering portion, and between the second conductor and the first part, and between the second part and the second side surface covering portion.

6. The multilayer capacitor according to claim 1, wherein the stacked body includes a third side surface and a fourth side surface that are spaced apart from each other in a third direction perpendicular to the first direction and the second direction, and in each laminate section, the first conductor and the second conductor are spaced apart from the third side surface and the fourth side surface.

7. The multilayer capacitor according to claim 6, wherein in each laminate section, the first part of the third conductor is exposed from the third side surface, and the second part of the third conductor is exposed from the fourth side surface.

8. The multilayer capacitor according to claim 7, further comprising a third external electrode spaced apart from the first external electrode and the second external electrode, wherein the third external electrode covers a part of the third side surface and is connected to the first part in each laminate section.

9. The multilayer capacitor according to claim 8, further comprising a fourth external electrode spaced apart from the first external electrode, the second external electrode and the third external electrode, wherein the fourth external electrode covers a part of the fourth side surface and is connected to the second part in each laminate section.

10. The multilayer capacitor according to claim 6, wherein in each laminate section, the dielectric member extends continuously from the third side surface and to the fourth side surface in the third direction.

11. The multilayer capacitor according to claim 1, wherein in each laminate section, the dielectric member is in contact with the first side surface covering portion and the second side surface covering portion.

12. A semiconductor device comprising:

a multilayer capacitor in accordance with claim 1;

a first switching element having a first element obverse surface and a first element reverse surface that are spaced apart from each other in the second direction;

a second switching element having a second element obverse surface and a second element reverse surface that are spaced apart from each other in the second direction; and a first conductive member and a second conductive member that are spaced apart from each other;

wherein the first switching element and the second switching element are connected in series and form a bridge, the first external electrode and the second external electrode are electrically connected to a first end and a second end of the bridge, respectively, the multilayer capacitor and the first switching element are mounted on the first conductive member, the second switching element is mounted on the second conductive member.

13. The semiconductor device according to claim 12, wherein the stacked body includes a stacked body obverse surface and a stacked body reverse surface that are spaced apart in the second direction and each connected to the first side surface and the second side surface, the second external electrode includes an obverse surface covering portion that is formed on the stacked body obverse surface and connected to the second side surface covering portion, the first external electrode includes a reverse surface covering portion that is formed on the stacked body reverse surface and connected to the first side surface covering portion.

14. The semiconductor device according to claim 13, wherein the first switching element includes a drive signal input electrode that is formed on the first element obverse surface and receives a drive signal, the multilayer capacitor includes a wiring layer that is formed on the stacked body obverse surface and spaced apart from the first side surface covering portion and the obverse surface covering portion, the wiring layer receives a drive signal for the first switching element.

15. The semiconductor device according to claim 13, wherein the multilayer capacitor is formed with an insulating film that insulates the second side surface covering portion and the first conductive member from each other.

16. The semiconductor device according to claim 12, wherein the first switching element includes a first obverse surface electrode formed on the first element obverse surface and a first reverse surface electrode formed on the first element reverse surface, the second switching element includes a second obverse surface electrode formed on the second element obverse surface and a second reverse surface electrode formed on the second element reverse surface, the first reverse surface electrode is bonded to the first conductive member, the second reverse surface electrode is bonded to the second conductive member, the first external electrode is bonded to the first conductive member, the first obverse surface electrode and the second conductive member are electrically connected to each other; and the second obverse surface electrode and the second external electrode are electrically connected to each other.

17. The semiconductor device according to claim 16, further comprising:

a first input terminal electrically connected to the first reverse surface electrode via the first conductive member;

a second input terminal electrically connected to the second obverse surface electrode and the first external electrode;

an output terminal electrically connected to the second reverse surface electrode via the second conductive member; and a connecting member electrically connecting the first obverse surface electrode and the second conductive member to each other.

18. The semiconductor device according to claim 13, further comprising:

an additional first switching element mounted on the first conductive member and connected in parallel to the above-mentioned first switching element; and an additional second switching element mounted on the second conductive member and connected in parallel to the above-mentioned second switching element.

* * * * *